US012539569B2

(12) United States Patent
Ode et al.

(10) Patent No.: US 12,539,569 B2
(45) Date of Patent: Feb. 3, 2026

(54) GROUPING FEATURES OF SHOWERHEADS IN SUBSTRATE PROCESSING SYSTEMS

(71) Applicant: Lam Research Corporation, Fremont, CA (US)

(72) Inventors: Rohit Ode, Portland, OR (US); Eugene Smargiassi, Tualatin, OR (US); Jeffrey Womack, Lake Oswego, OR (US); Nick Ray Linebarger, Jr., Beaverton, OR (US); Damodar Rajaram Shanbhag, Beaverton, OR (US); Eric Madsen, Sherwood, OR (US)

(73) Assignee: LAM RESEARCH CORPORATION, Fremont, CA (US)

( * ) Notice: Subject to any disclaimer, the term of this patent is extended or adjusted under 35 U.S.C. 154(b) by 666 days.

(21) Appl. No.: 17/922,079

(22) PCT Filed: Apr. 7, 2021

(86) PCT No.: PCT/US2021/026134
§ 371 (c)(1),
(2) Date: Oct. 28, 2022

(87) PCT Pub. No.: WO2021/221865
PCT Pub. Date: Nov. 4, 2021

(65) Prior Publication Data
US 2023/0166371 A1  Jun. 1, 2023

Related U.S. Application Data

(60) Provisional application No. 63/022,137, filed on May 8, 2020, provisional application No. 63/017,582, filed on Apr. 29, 2020.

(51) Int. Cl.
*B23B 35/00* (2006.01)
*B23Q 3/157* (2006.01)
(Continued)

(52) U.S. Cl.
CPC .............. *B23Q 3/157* (2013.01); *B23B 35/00* (2013.01); *C23C 16/45565* (2013.01); *H01J 37/3244* (2013.01); *H01J 2237/3321* (2013.01)

(58) Field of Classification Search
CPC ... B23B 35/00; B23Q 3/157; C23C 16/45565; H01J 2237/3321; H01J 37/3244
See application file for complete search history.

(56) References Cited

U.S. PATENT DOCUMENTS 6,050,506 A * 4/2000 Guo ...................... C23C 16/455
239/560
7,480,974 B2 * 1/2009 Steger ............... C23C 16/45565
156/345.34
(Continued)

FOREIGN PATENT DOCUMENTS

CN  105624644 A  6/2016
JP  2007162116 A  6/2007
(Continued)

OTHER PUBLICATIONS

Japanese Office Action for Japanese Application No. 2022-566401 datedJan. 28, 2025.
(Continued)

*Primary Examiner* — Nicole N Ramos

(57) ABSTRACT

A method includes selecting first features to be machined within a first tolerance range, and second features, which are located at least a predetermined distance apart, to be machined within a second tolerance range of a specified dimension for the selected features. The method includes machining, using a cutting attachment of a tool, the first features within the first tolerance range, and when a parameter associated with the tool causing variation in dimension of the first selected features reaches a predetermined threshold, machining, using the cutting attachment, the second selected features within the second tolerance range. In a
(Continued)

second method, a mean value of dimensions of the first and second features is less than or equal to a predetermined mean deviation from the specified dimension, and a standard deviation of the dimensions of the first and second features is less than or equal to a predetermined standard deviation.

14 Claims, 24 Drawing Sheets

(51) Int. Cl.
    *C23C 16/455* (2006.01)
    *H01J 37/32* (2006.01)

(56) References Cited

U.S. PATENT DOCUMENTS

| | | | | |
|---|---|---|---|---|
| 8,216,419 | B2* | 7/2012 | Moshtagh | ......... C23C 16/45508 118/715 |
| 8,216,640 | B2* | 7/2012 | Chao | ................ C23C 16/4404 427/249.4 |
| 2004/0244685 | A1 | 12/2004 | Ricci et al. | |
| 2006/0180275 | A1 | 8/2006 | Steger | |
| 2017/0167024 | A1* | 6/2017 | Wiltse | ............... C23C 16/45574 |

FOREIGN PATENT DOCUMENTS

| | | | | | |
|---|---|---|---|---|---|
| JP | 2008537628 | A | | 9/2008 | |
| JP | 2010132950 | A | | 6/2010 | |
| JP | 2014160817 | A | | 9/2014 | |
| JP | 2016188424 | A | | 11/2016 | |
| JP | 2018059183 | A | | 4/2018 | |
| KR | 20060011799 | A | * | 2/2006 | ......... B23Q 17/0957 |
| KR | 1020200040433 | A | | 4/2020 | |
| WO | WO-9500274 | A3 | | 4/1995 | |
| WO | WO-2020076562 | A1 | | 4/2020 | |

OTHER PUBLICATIONS

Taiwanese Office Action for Taiwanese Application No. 110115053 dated Feb. 8, 2025.
International Search Report and Written Opinion of the ISA issued in PCT/US2021/026134, mailed Aug. 6, 2021; ISA/KR.

* cited by examiner

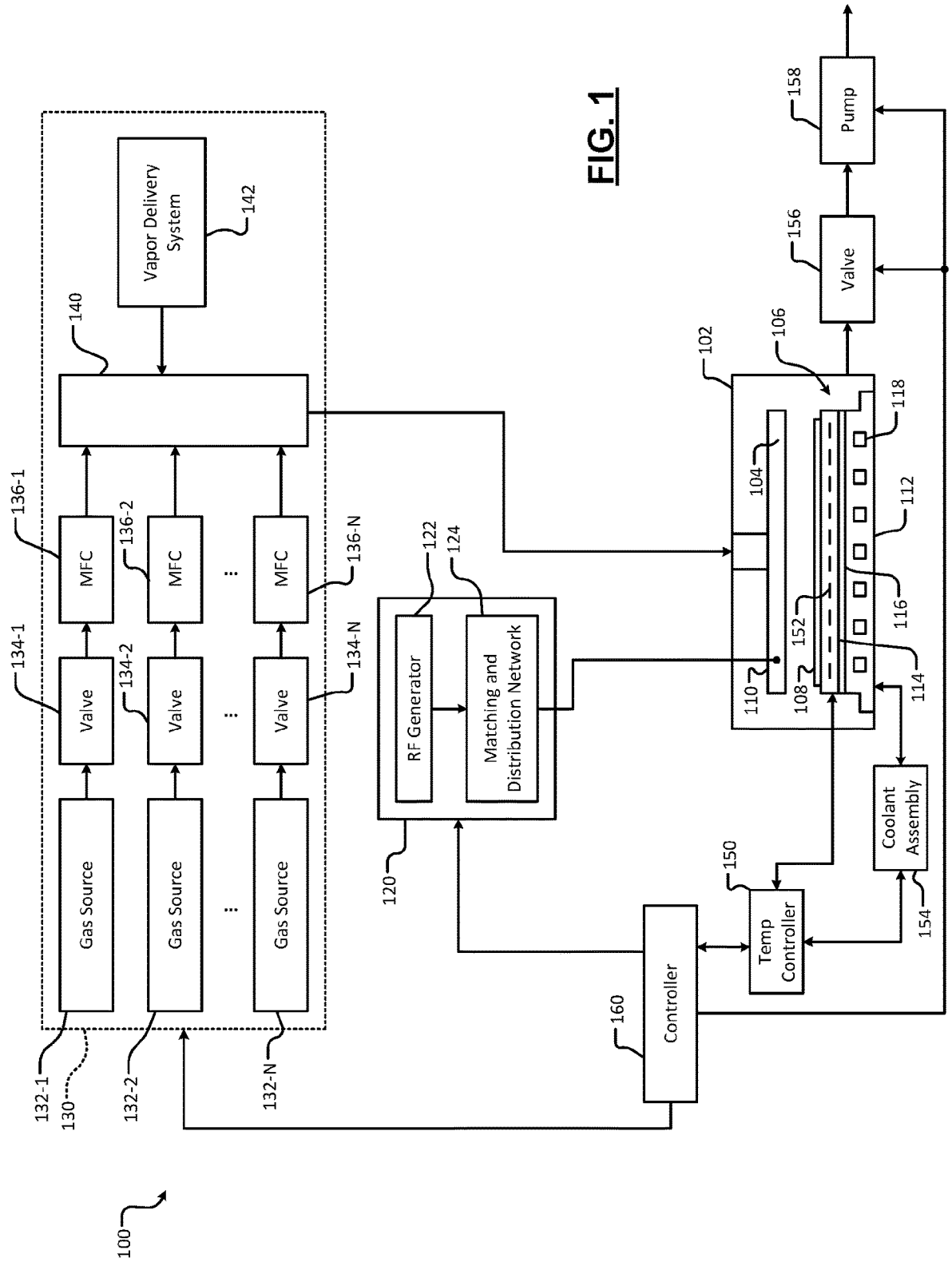

Detail A

| Symbol | Factor | Definition |
|---|---|---|
| T | Nominal target size [nom dia] | This defines the target mean value of the diameter for all features, as well as the target population mean. |
| t | Cutoff tolerance range [tol] | The distance from the nominal target size at which point no feature can exceed, or the part is rejected. This can typically be left as the historic tolerance value. Value is to be specified as a ± number. |
| $D_T$ | Max mean deviation from nominal target for mean of entire population [max mean dev] | The bounding window for the population mean. This does not define the range for any single feature, but specifically for the entire population defined within the feature pattern. Value is to be specified as a ± number. |
| $SD_{max}$ | Max standard deviation [max std dev] | The maximum allowable standard deviation of the entire feature pattern, calculated after inspection of 100% of features. |

FIG. 4A

| Symbol | Factor | Definition |
|---|---|---|
| USL | USL = T + t | The absolute maximum that any feature diameter can be within the population. Calculated from the nominal target plus the tolerance range. |
| LSL | LSL = T - t | The absolute minimum that any feature diameter can be within the population. Calculated from the nominal target minus the tolerance range. |
| $UD_T$ | $UD_T = T + D_T$ | The maximum that the feature population mean can be. |
| $LD_T$ | $LD_T = T - D_T$ | The minimum that the feature population mean can be. |
| μ | Population mean [mean] | This defines the actual population mean of the diameter for all features. |
| $D_\mu$ | $D_\mu = \mu - T$ | The bounding window for the population mean. This does not define the range for any single feature, but specifically for the entire population defined within the feature pattern. |

FIG. 4B

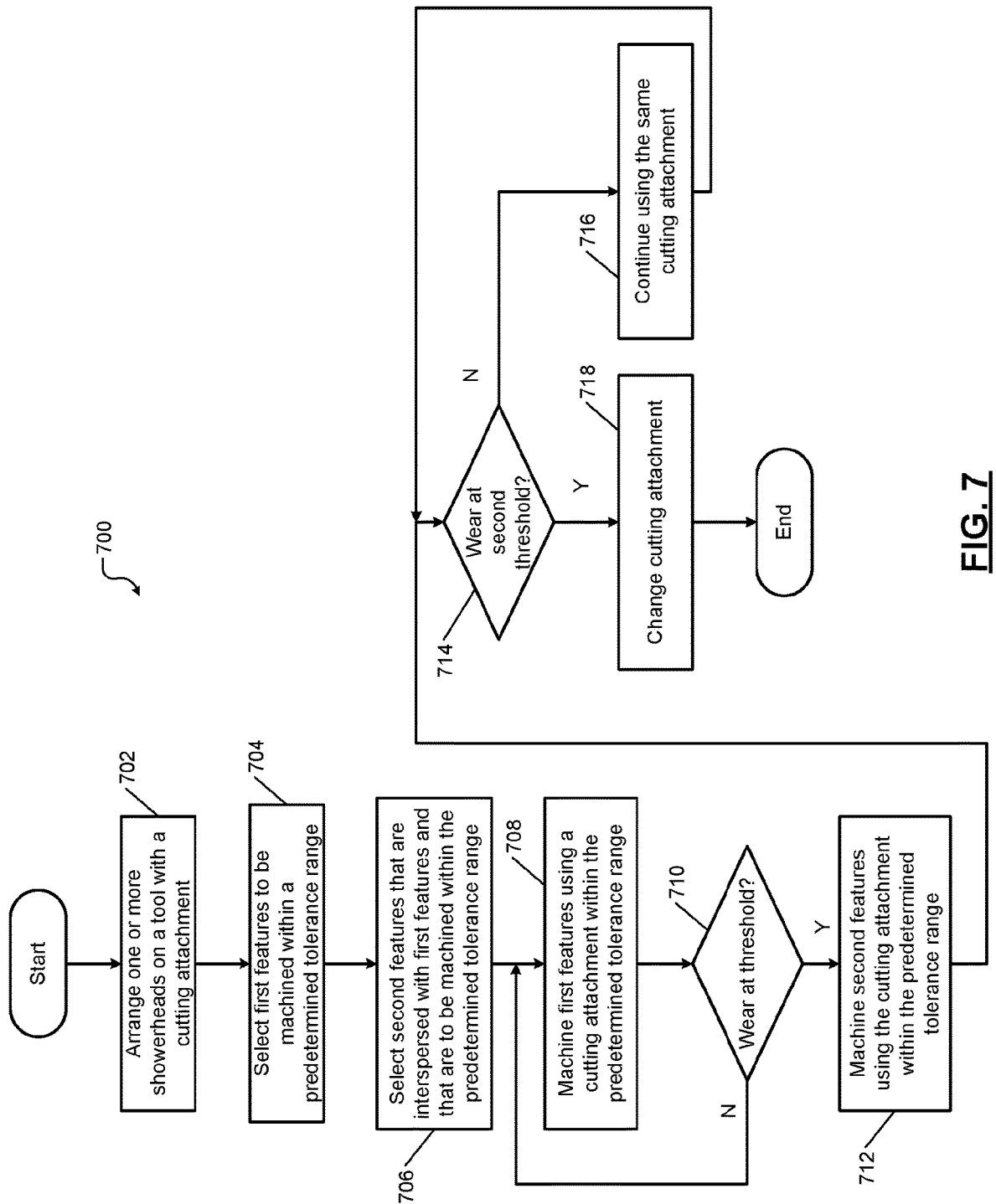

GROUPING FEATURES OF SHOWERHEADS IN SUBSTRATE PROCESSING SYSTEMS

CROSS-REFERENCE TO RELATED APPLICATIONS

This application is a U.S. National Phase Application under 35 U.S.C. 371 of International Application No. PCT/US2021/026134, filed on Apr. 7, 2021, which claims the benefit of U.S. Provisional Application No. 63,017,582, filed on Apr. 29, 2020 and U.S. Provisional Application No. 63/022,137, filed on May 8, 2020. The entire disclosures of the applications referenced above are incorporated herein by reference.

FIELD

The present disclosure relates generally to substrate processing systems and more particularly to grouping features of showerheads in substrate processing systems.

BACKGROUND

The background description provided here is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

A substrate processing system typically includes a plurality of processing chambers (also called process modules) to perform deposition, etching, and other treatments of substrates such as semiconductor wafers. Examples of processes that may be performed on a substrate include, but are not limited to, plasma enhanced chemical vapor deposition (PECVD), chemically enhanced plasma vapor deposition (CEPVD), sputtering physical vapor deposition (PVD), atomic layer deposition (ALD), and plasma enhanced ALD (PEALD). Additional examples of processes that may be performed on a substrate include, but are not limited to, etching (e.g., chemical etching, plasma etching, reactive ion etching, etc.) and cleaning processes.

During processing, a substrate is arranged on a substrate support assembly such as a pedestal or an electrostatic chuck (ESC) arranged in a processing chamber of the substrate processing system. A robot typically transfers substrates from one processing chamber to another in a sequence in which the substrates are to be processed. During deposition, gas mixtures including one or more precursors are introduced into the processing chamber, and plasma is struck to activate chemical reactions. During etching, gas mixtures including etch gases are introduced into the processing chamber, and plasma is struck to activate chemical reactions. The processing chambers are periodically cleaned by supplying a cleaning gas into the processing chamber and striking plasma.

SUMMARY

A method of manufacturing showerheads for a substrate processing system comprises arranging one or more of the showerheads on a tool including a cutting attachment. The method comprises selecting first selected features of a plurality of features to be machined within a first tolerance range of a specified dimension for the plurality of features. The method comprises selecting second selected features of the plurality of features, which are located at least a predetermined distance apart, to be machined within a second tolerance range of the specified dimension for the plurality of features. The first tolerance range is smaller than the second tolerance range. The method comprises machining, using the cutting attachment, the first selected features of the plurality of features within the first tolerance range. The method comprises when a parameter associated with the tool causing variation in dimension of the first selected features reaches a predetermined threshold, machining, using the cutting attachment, the second selected features of the plurality of features within the second tolerance range.

In other aspects, the parameter includes wear on the cutting attachment, temperature of the cutting attachment, temperature of the tool, or temperature of the one or more of the showerheads being machined.

In other aspects, the parameter includes wear on the cutting attachment, and the method further comprises estimating the wear on the cutting attachment based on at least one of a machining time for which the cutting attachment is used on the tool, a number of features cut using the cutting attachment, and a sensed wear on the cutting attachment.

In another aspect, the first selected features and the second selected features are located on one of the showerheads.

In another aspect, the first selected features and the second selected features are the same.

In another aspect, the first selected features and the second selected features are located on a plurality of the showerheads.

In other aspects, the parameter includes wear on the cutting attachment, and the method further comprises changing the cutting attachment of the tool when the cutting attachment reaches a second predetermined threshold greater than the predetermined threshold.

In another aspect, the method further comprises changing the cutting attachment of the tool after machining a predetermined number of the showerheads using the cutting attachment.

In other aspects, the method further comprises selecting third selected features of a second plurality of features to be machined within a third tolerance range of a second specified dimension for the second plurality of features. The method further comprises selecting fourth selected features of the second plurality of features, that are located at least a second predetermined distance apart, to be machined within a fourth tolerance range of the second specified dimension. The third tolerance range is smaller than the fourth tolerance range. The method further comprises machining, using the cutting attachment, the third selected features within the third tolerance range. The method further comprises when the parameter reaches a second predetermined threshold, machining, using the cutting attachment, the fourth selected features within the fourth tolerance range.

In other aspects, the third and fourth selected features are different than the first and second selected features. The second specified dimension is different than the specified dimension. The third and fourth tolerance ranges are different than the first and second tolerance ranges. The second predetermined distance is different than the predetermined distance.

In another aspect, the first, second, third, and fourth selected features are located on one of the showerheads.

In another aspect, the first, second, third, and fourth selected features are located on a plurality of the showerheads.

In another aspect, the method further comprises machining the third selected features after machining the first selected features and before machining the second selected features.

In another aspect, the third and fourth selected features modify the first and second selected features.

In another aspect, the method further comprises machining the third and fourth selected features after machining the first selected features and before machining the second selected features.

In another aspect, the method further comprises machining the third and fourth selected features after machining the second selected features.

In still other aspects, a method of manufacturing showerheads for a substrate processing system comprises arranging one or more of the showerheads on a tool including a cutting attachment. The method comprises selecting first selected features of a plurality of features to be machined within a predetermined tolerance range of a specified dimension for the plurality of features. The method comprises selecting second selected features of the plurality of features, which are interspersed with the first selected features, to be machined within the predetermined tolerance range of the specified dimension for the plurality of features. The method comprises machining, using the cutting attachment, the first selected features within the predetermined tolerance range. The method comprises when a parameter associated with the tool causing variation in dimension of the first selected features reaches a predetermined threshold, machining, using the cutting attachment, the second selected features within the predetermined tolerance range. A mean value of dimensions of the first and second selected features is less than or equal to a predetermined mean deviation from the specified dimension. A standard deviation of the dimensions of the first and second selected features is less than or equal to a predetermined standard deviation.

In other aspects, the parameter includes wear on the cutting attachment, temperature of the cutting attachment, temperature of the tool, or temperature of the one or more of the showerheads being machined.

In other aspects, the parameter includes wear on the cutting attachment, and the method further comprises estimating the wear on the cutting attachment based on at least one of a machining time for which the cutting attachment is used on the tool, a number of features cut using the cutting attachment, and a sensed wear on the cutting attachment.

In another aspect, the first selected features and the second selected features are located on one of the showerheads.

In another aspect, the first selected features and the second selected features are the same.

In another aspect, the first selected features and the second selected features are located on a plurality of the showerheads.

In other aspects, the parameter includes wear on the cutting attachment, and the method further comprises changing the cutting attachment of the tool when the cutting attachment reaches a second predetermined threshold greater than the predetermined threshold.

In another aspect, the method further comprises changing the cutting attachment of the tool after machining a predetermined number of the showerheads using the cutting attachment.

In still other aspects, a showerhead comprises a stem portion to connect to a processing chamber, and a base portion extending from the stem portion and including a plurality of features to introduce a gas into the processing chamber. First features of the plurality of features have dimensions within a first tolerance range of a specified dimension for the plurality of features. Second features of the plurality of features have dimensions within a second tolerance range of the specified dimension and not within the first tolerance range and are located at least a predetermined distance apart. The first tolerance range is smaller than the second tolerance range.

In other aspects, the plurality of features includes through holes, and the dimensions include diameters of the through holes.

In another aspect, the plurality of features includes more than N hundred features, where N is an integer greater than 1.

In another aspect, the plurality of features includes more than N thousand features, where N is an integer greater than 1.

In still other aspects, a showerhead comprises a stem portion to connect to a processing chamber, and a base portion extending from the stem portion and including a plurality of features to introduce a gas into the processing chamber. First features of the plurality of features have dimensions within a predetermined tolerance range of a specified dimension for the plurality of features. Second features of the plurality of features having dimensions smaller than the first features are interspersed with the first features and have dimensions within the predetermined tolerance range. A mean value of the dimensions of the first and second features is less than or equal to a predetermined mean deviation from the specified dimension. A standard deviation of the dimensions of the first and second features is less than or equal to a predetermined standard deviation.

In other aspects, the plurality of features includes through holes, and the dimensions include diameters of the through holes.

In another aspect, the plurality of features includes more than N hundred features, where N is an integer greater than 1.

In another aspect, the plurality of features includes more than N thousand features, where N is an integer greater than 1.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein:

FIG. 1 shows an example of a substrate processing system;

FIGS. 4A and 4B show tables including symbols and descriptions of statistical parameters used in a second method to manufacture and qualify components manufactured according to the present disclosure;

FIG. 7 shows a flowchart of a method to manufacture features of components such as showerheads according to the specifications of the second method of the present disclosure.

In the drawings, reference numbers may be reused to identify similar and/or identical elements.

DETAILED DESCRIPTION

Figure 2A:
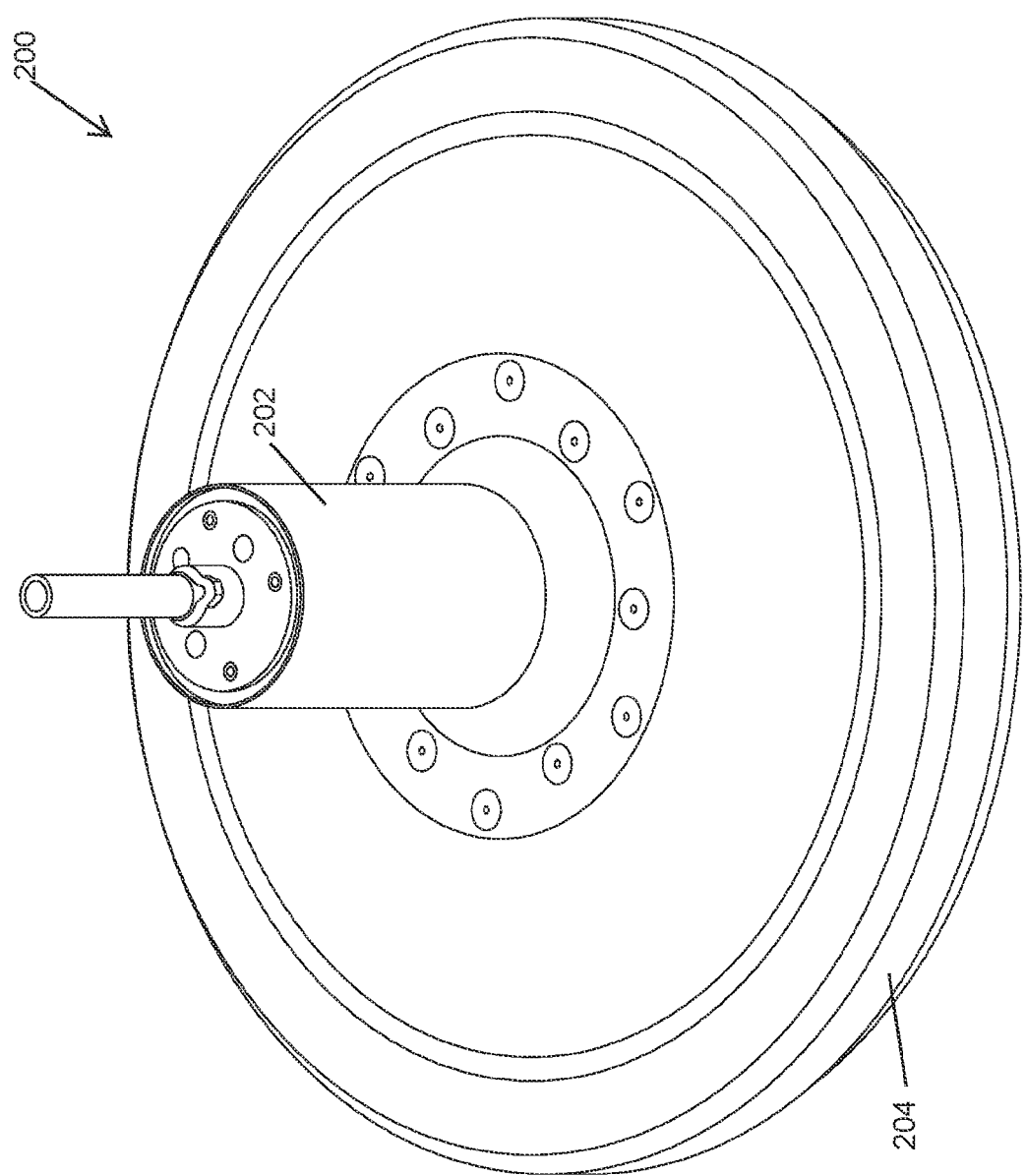
FIGS. 2A-2C show an example of a showerhead used in the substrate processing system.

A gas distribution device, commonly called a showerhead, is used to introduce one or more gases such as process, purge, or cleaning gases into a processing chamber. FIG. 1 and its description below provide an example of a substrate processing system comprising a processing chamber with a showerhead. A showerhead includes an inlet to receive one or more gases from a gas distribution system and includes numerous outlets or features such as slots or through holes for injecting the one or more gases into a processing chamber. The dimensions (i.e., sizes) and geometries (i.e., shapes) of the features are specified depending on an application (e.g., process) used in the processing chamber. Examples of dimensions include size (e.g., diameter or perimeter) of the features, distribution/density (e.g., number of features per square inch) of the features, and so on. Examples of geometries include shapes (e.g., circular, cylindrical, conical, polygonal, and so on) of the features.

Showerheads are typically made of a metal such as aluminum. Showerheads can also be made of an alloy or of a ceramic material. The features of the showerheads are manufactured using tools with attachments such as cutters or drill bits of specific sizes. The attachments begin to wear after drilling some quantity of features (e.g., after manufacturing features of few showerheads). Continued use of worn attachments produces features that do not conform to the specification.

When non-conforming features are produced in clusters, the clustering of the non-conforming features can cause thickness non-uniformities in substrates processed using processes that are highly sensitive to feature dimensions of the showerheads. To avoid clustering of non-conforming features, some manufacturers adhere to a specified order, sequence, or pattern of producing the features, which can be onerous. Alternatively, the manufacturers have to frequently replace the attachments such as cutters or drill bits (e.g., after manufacturing features of every showerhead or two showerheads), which can be expensive.

The present disclosure provides two methods to avoid clustering of non-conforming features and to allow manufacturers to use worn attachments to some extent. These methods can be used to manufacture components without frequently changing the attachments and also to verify whether the manufactured components conform to specifications. A first method uses or specifies two criteria: first, a subrange that is smaller than a larger tolerance range; and second, a minimum distance rule. The dimensions of all of the features of a showerhead must be within the larger tolerance range. Additionally, the dimensions of most, if not all, features must also be within the smaller subrange of the larger tolerance range. Furthermore, when the dimensions of some features are not within (i.e., are outside) the smaller subrange, each of these features must be at least a predetermined distance apart from others of these features.

For example, if F (e.g., 3931) is the total number of features of a showerhead, the dimensions (e.g., diameter) of all of the F features of the showerhead must be within a first tolerance range of a specified nominal diameter for the F features. For example, all of the F features of the showerhead must be within X % (e.g., 5%) of the specified nominal diameter. Further, the dimensions of most (e.g., M), if not all, of the F features must be within a second tolerance range (called the subrange), which is tighter (i.e., smaller) than the first tolerance range. For example, the diameters of the M features must be within Y % (e.g., 1.25%) of the specified nominal diameter, where Y<X. Furthermore, when the dimensions of N of the F features are not within (i.e., are outside) the second tolerance range, where N=F−M and N≥2, each of the N features must be at least a predetermined distance D apart from others of the N features (called a minimum distance rule). That is, a first one of the N features must be at least a distance D apart from the rest of N features; a second one of the N features must be at least a distance D apart from the rest of N features; and so on.

By employing the subrange and applying the minimum distance rule, the first method of the present disclosure prevents clustering of non-conforming features. The first method allows manufacturers to use a worn attachment so long as the features manufactured using the worn attachment satisfy the subrange and the minimum distance rule. The first method also allows the manufacturers to produce the features in any manner instead of adhering to a specific drilling pattern or sequence so long as the produced features satisfy the subrange and the minimum distance rule.

A second method according to the present disclosure defines feature tolerances based on statistics, rather than conventional pass/fail methods, in components that have sufficiently large or statistically significant populations of process-critical features. The statistics can include diameter, position, and pattern distribution of defined features. A component (e.g., a showerhead) passes inspection for feature size (e.g., diameter) if the following three statistical requirements are satisfied (the requirements and definitions of statistical terms are explained below in detail): first, no feature diameter exceeds a cutoff tolerance range t; second, the population mean does not exceed a maximum mean deviation $D_T$; and third, the standard deviation (SD) of the population does not exceed $SD_{max}$. The manufacturing sequence of indicated large-population features is randomized by the manufacturer to distribute any form of tool wear, thermal effects, and/or other step-dependent effect uniformly across the feature population. Once the sequence is empirically optimized and verified to produce features that conform to the three statistical requirements for a component, the sequence is then used repeatedly to manufacture predetermined quantities of the component.

The second method also allows manufacturers to use a worn attachment so long as the features manufactured using the worn attachment satisfy the three statistical requirements of the second method. Further, the second method also allows the manufacturers to produce the features in any empirically tested manner instead of adhering to a specified drilling pattern or sequence so long as the produced features satisfy the three statistical requirements of the second method.

These and other aspects of the first and second methods of the present disclosure are described below in detail. Throughout the present disclosure, a showerhead is used only as an example of a component manufactured using the first and second methods to illustrate the teachings of the present disclosure. The teachings are not limited to showerheads. Further, the teachings are not limited to components of semiconductor manufacturing equipment either. Rather, the teachings can be applied to any component having a statically significant (i.e., sufficiently large) population of a feature or features.

The present disclosure is organized as follows. Initially, an example of a processing chamber in which a showerhead manufactured according to the present disclosure can be used is shown and described with reference to FIG. 1. Thereafter, an example of a showerhead and its features is shown and described with reference to FIGS. 2A-2C. Subsequently, the first method is described with reference to FIGS. 3A-3H, and the second method is described with reference to FIGS. 4A-4I. Finally, a block diagram of a system that can manufacture components using the first and second methods is shown and described reference to FIG. 5.

FIG. 1 shows an example of a substrate processing system 100 comprising a processing chamber 102 configured to generate capacitively coupled plasma. While the example is described in the context of plasma enhanced chemical vapor deposition (PECVD), the teachings of the present disclosure can be applied to other types of substrate processing such as atomic layer deposition (ALD), plasma enhanced ALD (PEALD), CVD, or also other processing including etching.

The substrate processing system 100 comprises the processing chamber 102 that encloses other components of the substrate processing system 100 and contains RF plasma (if used). The processing chamber 102 comprises an upper electrode 104 and an electrostatic chuck (ESC) 106 or other type of substrate support. During operation, a substrate 108 is arranged on the ESC 106.

For example, the upper electrode 104 may include a gas distribution device 110 such as a showerhead that introduces and distributes process gases into the processing chamber 102. The gas distribution device 110 may include a stem portion including one end connected to a top surface of the processing chamber 102. A base portion of the showerhead is generally cylindrical and extends radially outwardly from an opposite end of the stem portion at a location that is spaced from the top surface of the processing chamber 102. A substrate-facing surface or faceplate of the base portion of the showerhead includes a plurality of outlets or features (e.g., slots or through holes) through which vaporized precursor, process gas, cleaning gas, or purge gas flows.

The ESC 106 comprises a baseplate 112 that acts as a lower electrode. The baseplate 112 supports a heating plate 114, which may correspond to a ceramic multi-zone heating plate. A thermal resistance layer 116 may be arranged between the heating plate 114 and the baseplate 112. The baseplate 112 may include one or more channels 118 for flowing coolant through the baseplate 112.

If plasma is used, an RF generating system (or an RF source) 120 generates and outputs an RF voltage to one of the upper electrode 104 and the lower electrode (e.g., the baseplate 112 of the ESC 106). The other one of the upper electrode 104 and the baseplate 112 may be DC grounded, AC grounded, or floating. For example, the RF generating system 120 may include an RF generator 122 that generates RF power that is fed by a matching and distribution network 124 to the upper electrode 104 or the baseplate 112. In other examples, while not shown, the plasma may be generated inductively or remotely and then supplied to the processing chamber 102.

A gas delivery system 130 includes one or more gas sources 132-1, 132-2, . . . , and 132-N (collectively gas sources 132), where N is an integer greater than zero. The gas sources 132 are connected by valves 134-1, 134-2, . . . , and 134-N (collectively valves 134) and mass flow controllers 136-1, 136-2, . . . , and 136-N (collectively mass flow controllers 136) to a manifold 140. A vapor delivery system 142 supplies vaporized precursor to the manifold 140 or another manifold (not shown) that is connected to the processing chamber 102. An output of the manifold 140 is fed to the processing chamber 102. The gas sources 132 may supply process gases, cleaning gases, or purge gases.

A temperature controller 150 may be connected to a plurality of thermal control elements (TCEs) 152 arranged in the heating plate 114. The temperature controller 150 may be used to control the plurality of TCEs 152 to control a temperature of the ESC 106 and the substrate 108. The temperature controller 150 may communicate with a coolant assembly 154 to control coolant flow through the channels 118. For example, the coolant assembly 154 may include a coolant pump, a reservoir, and one or more temperature sensors (not shown). The temperature controller 150 operates the coolant assembly 154 to selectively flow the coolant through the channels 118 to cool the ESC 106. A valve 156 and pump 158 may be used to evacuate reactants from the processing chamber 102. A system controller 160 controls the components of the substrate processing system 100.

Figure 2B:
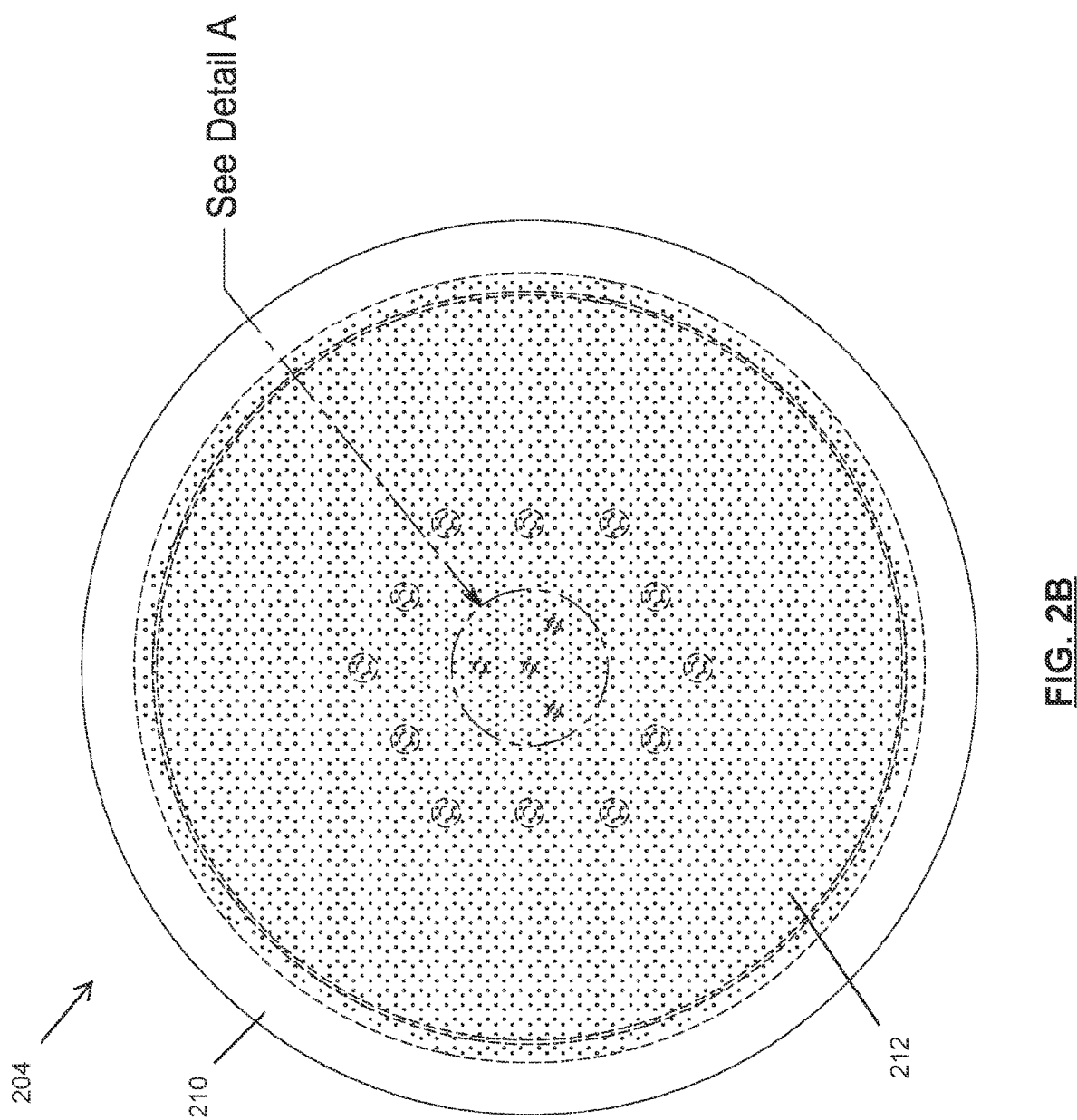
Figure 2C:
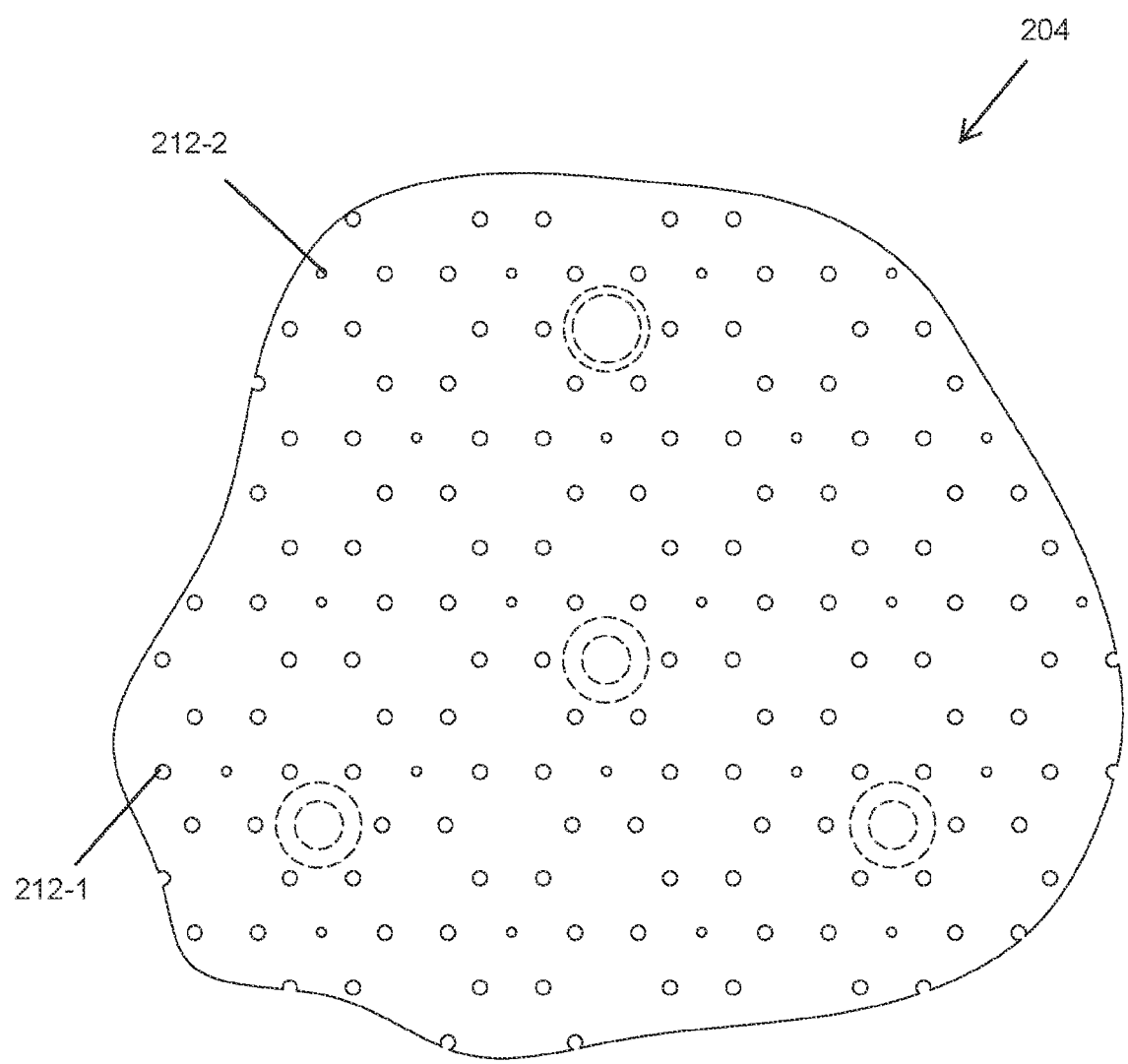

FIGS. 2A-2C shows an example of a showerhead assembly. FIG. 2A shows a perspective view of a showerhead assembly. FIGS. 2B and 2C show examples of features of the showerhead assembly. FIG. 2B shows the features on a substrate-facing surface or faceplate of the showerhead assembly. FIG. 2C shows the features in detail.

In FIG. 2A, a showerhead assembly 200 such as the gas distribution device 110 shown in FIG. 1 includes a stem portion 202 including one end connected to a top surface of a processing chamber such as the processing chamber 102 shown in FIG. 1. The step portion 202 includes an inlet to receive vaporized precursor, process gas, cleaning gas, or purge gas from a gas delivery system such as the gas delivery system 130 shown in FIG. 1.

A base portion 204 of the showerhead assembly 200 is generally cylindrical and extends radially outwardly from an opposite end of the stem portion 202 at a location that is spaced from the top surface of the processing chamber. A substrate-facing surface or faceplate 210 (shown in FIG. 2B) of the base portion 204 includes a plurality of outlets or features (e.g., slots or through holes) 212. The vaporized precursor, process gas, cleaning gas, or purge gas from the inlet flows through the features 212 into the processing chamber.

In FIG. 2B, the faceplate 210 of the showerhead assembly 200 includes the plurality of features 212. In some examples, all of the features 212 may have the same size and shape. For example, all of the features 212 may be circular and have the same diameter. In some examples, the features 212 may comprise a plurality of sets of features. For example, a first set of features having a first size and a first shape may be arranged at a first location on the showerhead assembly 200 while a second set of features having a second size and a second shape may be arranged at a second location on the showerhead assembly 200. At least one of the second size and the second shape may be different than the first size and the first shape. For example, in FIG. 2C, two sets of features are shown. A first set includes features 212-1, and a second set includes features 212-2. While both features 212-1 and 212-2 are circular, the features 212-1 have a larger diameter than the features 212-2.

In FIG. 2C, for example only, the features 212-2 are very few in quantity relative to the first features 212-1. For example, while the first set of features 212-1 includes several thousand features, which is statistically significant, the second set of features 212-2 includes much less than fifty or one hundred features (e.g., one or two dozen), which is not statistically significant. As a result, the influence of the second set of features 212-2 on the processes is negligible, and the first method need not be applied to these second set of features 212-2.

However, in some examples, each of the first and second sets of features 212-1, 212-2 may include statistically significant population of features. For example, the number of features in each of the first and second sets of features 212-1, 212-2 may include several hundred or thousand features. Accordingly, the first method can be applied to each of the first and second sets of features 212-1, 212-2 with separate specifications for the subrange and the minimum distance for each of the first and second sets of features 212-1, 212-2.

Stated differently, some showerheads (or generally components) may include two sets of features. A first set may include first features having a first size (e.g., diameter) D1 and may be produced in quantity F1. A second set may include second features having a second size (e.g., diameter) D2 and may be produced in quantity F2. The first and second features may be produced in separate regions of the showerhead, or may be interspersed in one or more regions of the showerhead (e.g., as shown in FIG. 2C, except that both F1 and F2 may be statistically significant). D1 may be greater or less than D2 or equal to D2 in some applications. Regardless, the teachings of the subrange and the minimum distance rule apply to both first and second features. The values of the subrange and the minimum distance may be different for the second feature than for the first feature depending their size, quantity, and location.

The first method involving the subrange and the minimum distance rule is now described in further detail with reference to FIGS. 3A-3H. Current showerhead specifications control the feature size using a relatively large tolerance range. While the large tolerance range is desirable for efficient manufacturability and competitive costing of showerheads, the large tolerance range adversely affects processes that are flow sensitive. This is because these specifications do not include constraints to control clustering of same size features within the large tolerance range, which can be problematic for sensitive processes. As a result, the current specifications for feature size cause thickness non-uniformity in substrates due to clustering of similar size features compared to rest of the features of the showerhead.

According to the first method, the grouping of features is controlled to ensure that features above or below a feature size range are not clustered together at any location on the showerhead. This control is designed to ensure that sensitive processes are not influenced by variations in feature sizes within an acceptable tolerance range. Features with sizes outside the specified tolerance range are manufactured at least a predefined distance apart from the other similar features with sizes outside the specified range. This method ensures that similar size features with sizes beyond an acceptable tolerance range are not manufactured in a cluster. The first method maintains the larger tolerance range for overall feature size, and uses an additional smaller subrange along with the minimum distance rule to ensure that a large population of features are within the acceptable feature size and that out-of-range features (called outliers) are not clustered together to form patterns. Thus, the first method ensures uniform distribution of features on the showerhead. While current specifications may form random patterns of similar size features in the tolerance range, the first method allows the manufacture of features with the same tolerance range but with the added controls of the subrange and the minimum distance rule.

FIGS. 3A-3H show how the first method can be used to manufacture showerheads by applying the subrange and the minimum distance rule and also to qualify or disqualify the manufactured showerheads by applying the subrange and the minimum distance rule. FIGS. 3A-3G show various examples of applying the subrange and the minimum distance rule to a set of features (e.g., the first set of features 212-1 shown in FIG. 2B). These figures show histograms of feature sizes of showerheads manufactured using the first method. In these figures, showerheads having 3931 features of a specified diameter are used as illustrative examples. For example, the showerheads used in these figures may be similar to the showerhead assembly 200 shown in FIG. 2A, where the first set of features 212-1 is equal to 3931.

The dimensions (e.g., diameter) of all of the 3931 features of the showerhead must be within a first tolerance range. For example, diameters of all of the 3931 features must be within X % (e.g., 5%) of a specified diameter. For example only, while any suitable value for the first tolerance range may be used, the value of the first tolerance range used in these figures is 0.04 inch±0.001 inch, where 0.04 inch is the specified nominal diameter in these figures. Further, the dimensions of most (e.g., M), if not all, of the 3931 features must be within a second tolerance range (called the subrange), which is smaller (i.e., tighter) than the first tolerance range. For example, the diameters of the M features must be within Y % (e.g., 1.25%) of the specified nominal diameter, which is 0.04 inch in these figures, where Y<X. For example only, while any suitable value for the subrange may be used, the value of the subrange used in these figures is 0.0005 inch. Furthermore, when the dimensions of N of the 3931 features are not within (i.e., are outside) the subrange, where N=3931−M and N≥2, each of the N features must be at least a distance D apart from others of the N features (called a minimum distance rule). For example only, while any suitable value for the minimum distance may be used, the value of the minimum distance used in these figures is 1.0 inch.

Figure 3A:
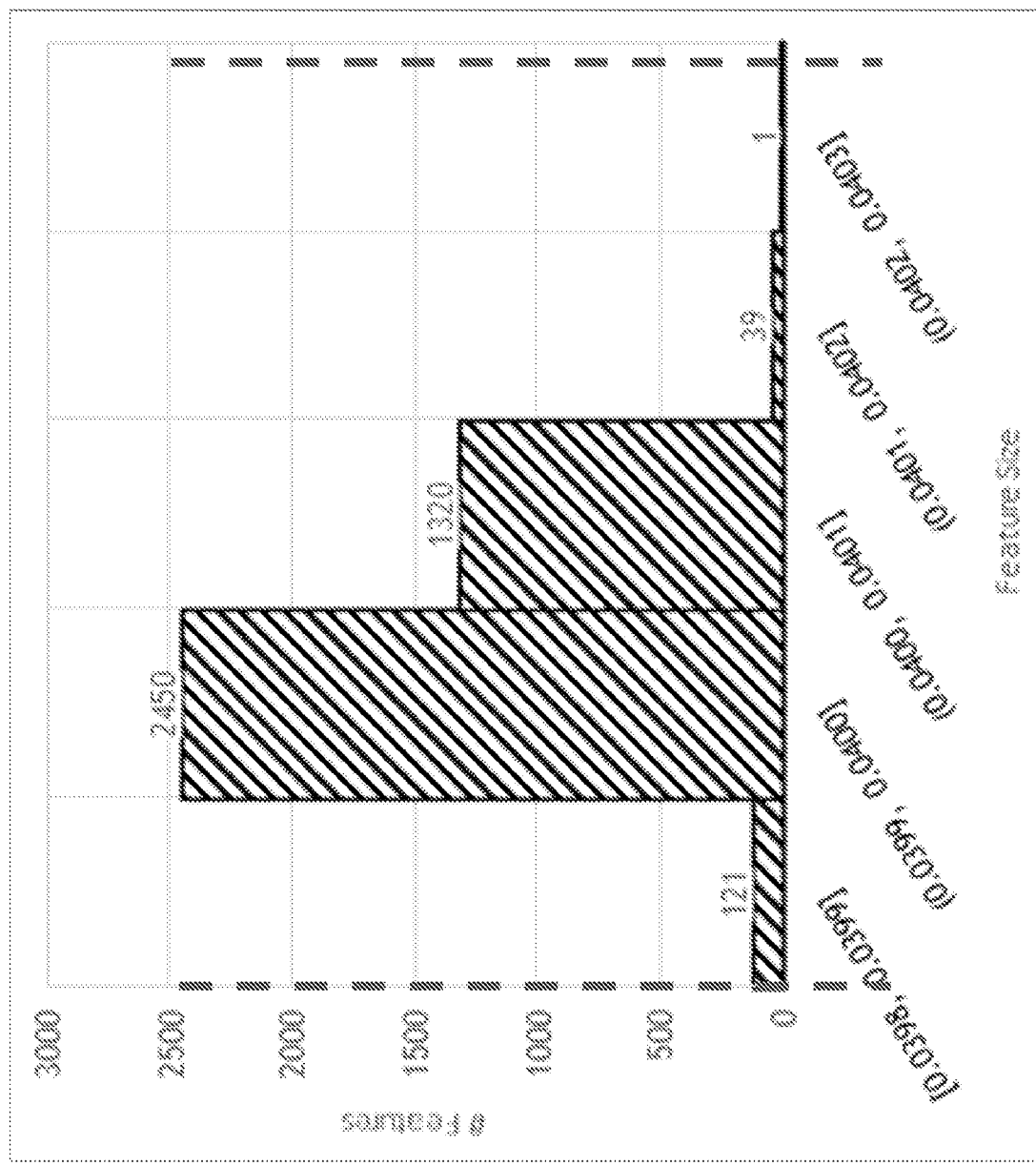
FIGS. 3A-3G show examples of histograms of feature sizes of showerheads manufactured using a first method according to the present disclosure.

In FIG. 3A, in a first example of a showerhead assembly manufactured according to the first method, the diameters of all of the 3931 features are within the first tolerance range, which is 0.04 inch±0.001 inch in this example, where 0.04 inch is the specified nominal diameter. Further, the diameters of all of the 3931 features fall in five distinct ranges (bins), each of 0.0001 inch. Accordingly, the diameters of all of the features are within the specified subrange, which is 0.0005 inch in this example (shown by two vertical dotted lines). Accordingly, the showerhead assembly in this example is acceptable (i.e., manufactured according to the tolerance and subrange specifications) of the first method. Conversely, the manufacturer may continue to use a previously used drill bit, which probably previously produced features with more uniform diameters than those shown in this example, so long as the manufacturer can manufacture a showerhead assembly with feature sizes as shown in this example.

Figure 3B:
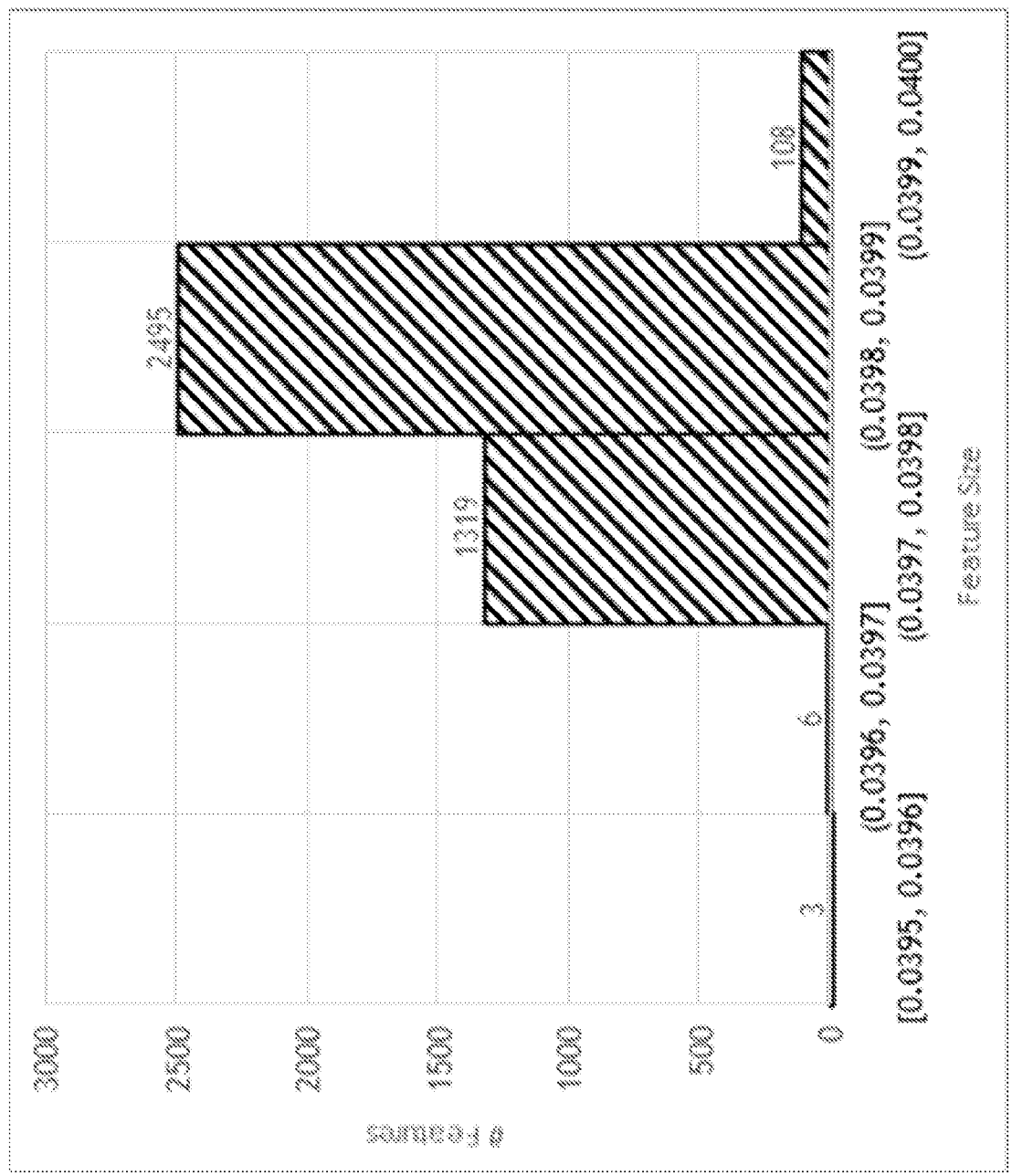

In FIG. 3B, in a second example of a showerhead assembly manufactured according to the first method, the diameters of all of the 3931 features are within the first tolerance range, which is 0.04 inch ±0.001 inch in this example, where 0.04 inch is the specified nominal diameter. Further, the diameters of all of the 3931 features fall in five distinct ranges (bins), each of 0.0001 inch. Accordingly, the diameters of all of the features are within the specified subrange, which is 0.0005 inch in this example (shown by two vertical dotted lines). Accordingly, the showerhead assembly in this example is also acceptable (i.e., manufactured according to the tolerance and subrange specifications) of the first method. Conversely, the manufacturer may continue to use a previously used drill bit, which probably previously produced features with more uniform diameters than those shown in this example, so long as the manufacturer can manufacture a showerhead assembly with feature sizes as shown in this example.

Figure 3C:
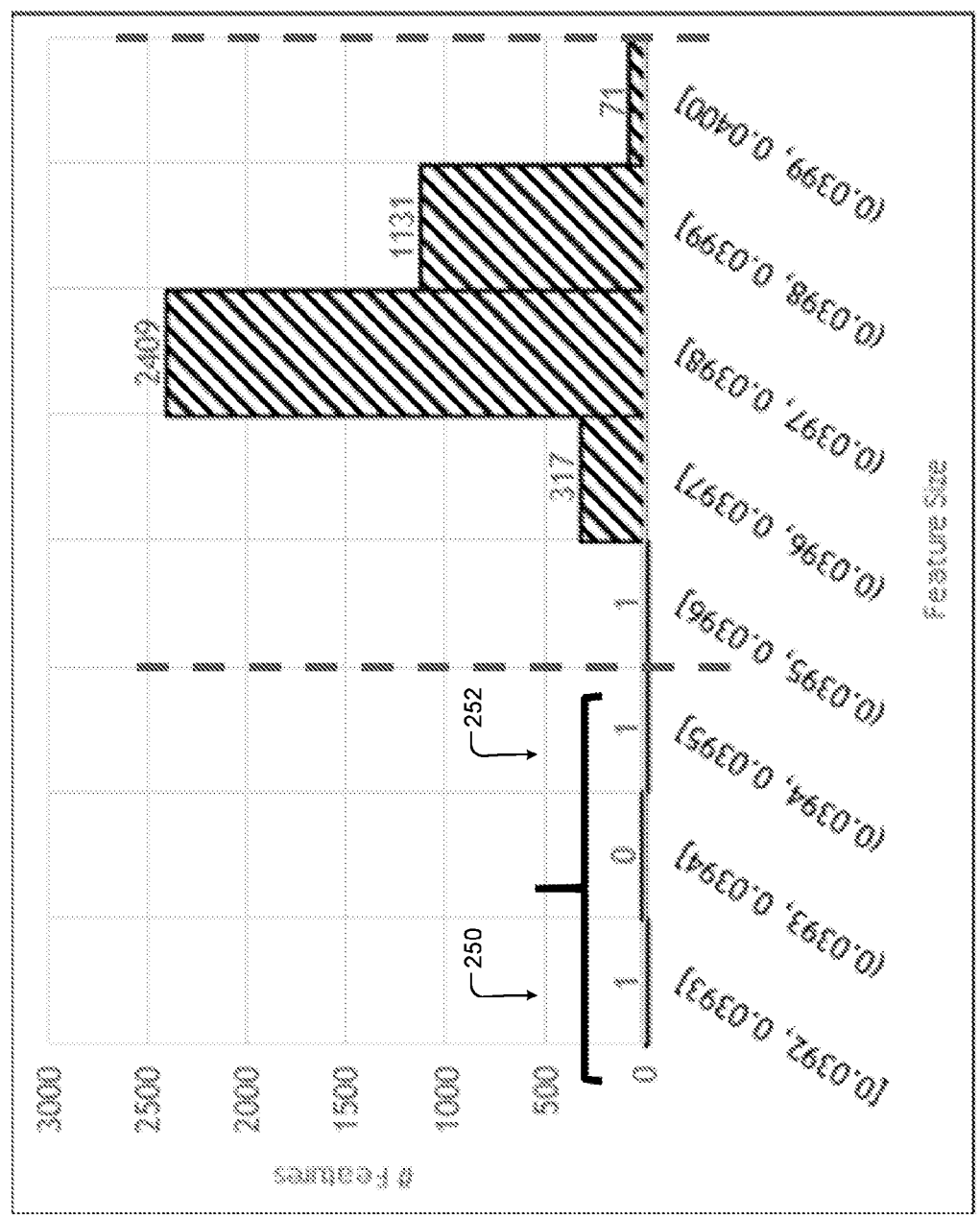
Figure 3D:
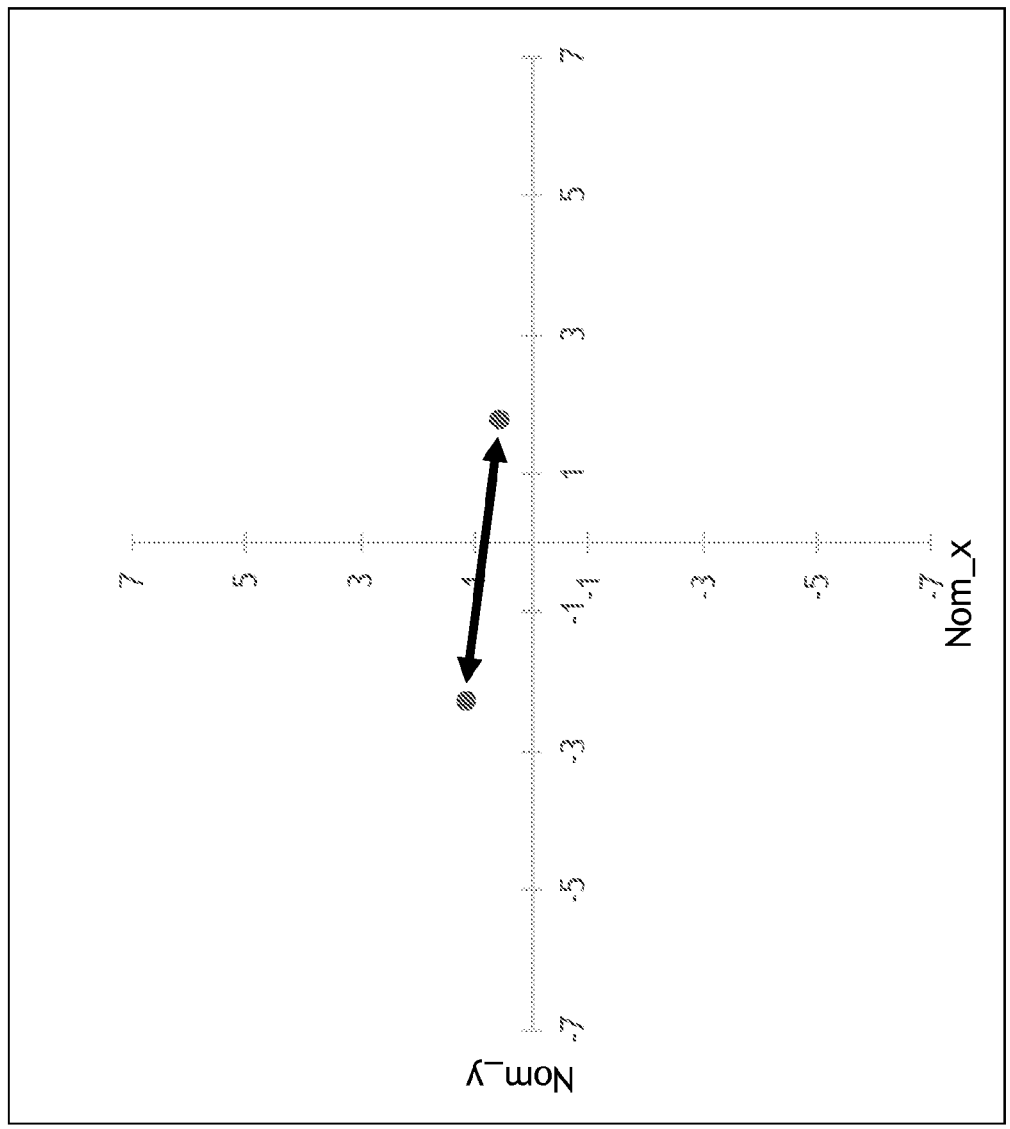

In FIGS. 3C and 3D, in a third example of a showerhead assembly manufactured according to the first method, the diameters of all of the 3931 features are within the first tolerance range, which is 0.04 inch±0.001 inch in this example, where 0.04 inch is the specified nominal diameter. Further, the diameters of all except two of the 3931 features identified at 250 and 252 fall in five distinct ranges (bins) of 0.0001 inch. The diameters of the two features identified at 250 and 252 are within the first tolerance range but are not within the specified subrange, which is within 0.0005 inch of the specified nominal diameter in this example (shown by two vertical dotted lines), and are therefore called outliers 250, 252. That is, the difference between the specified nominal diameter and the diameter of each of the two outliers 250, 252 is greater than the specified subrange, which is 0.0005 inch in this example. Accordingly, although the diameters of the two outliers 250, 252 are within the first tolerance range, the diameters of the two outliers 250, 252 are not within the specified subrange.

However, as FIG. 3D shows, the two outliers 250, 252 are spaced apart from each other by at least one inch, which is the minimum distance required between features that are not within the specified subrange in this example. Therefore, the showerhead assembly in this example is acceptable (i.e., manufactured according to the tolerance and minimum distance rule specifications) of the first method. Conversely, the manufacturer may continue to use a previously used drill bit, which probably previously produced features with more uniform diameters than those shown in this example, so long as the manufacturer can manufacture a showerhead assembly with feature sizes as shown in this example.

Figure 3E:
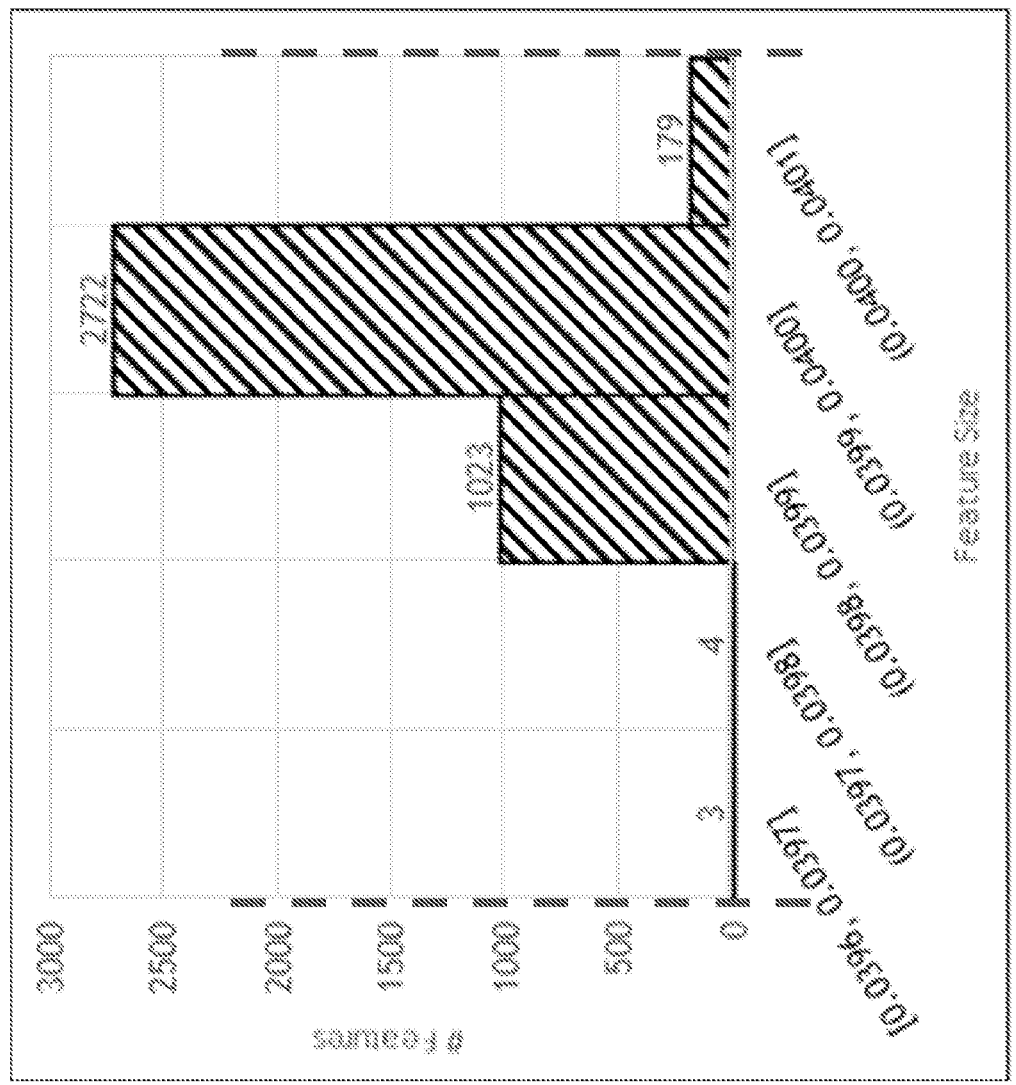

In FIG. 3E, in a fourth example of a showerhead assembly manufactured according to the first method, the diameters of all of the 3931 features are within the first tolerance range, which is 0.04 inch ±0.001 inch in this example, where 0.04 inch is the specified nominal diameter. Further, the diameters of all of the 3931 features fall in five distinct ranges (bins), each of 0.0001 inch. Accordingly, the diameters of all of the features are within the specified subrange, which is 0.0005 inch in this example (shown by two vertical dotted lines). Accordingly, the showerhead assembly in this example is also acceptable (i.e., manufactured according to the tolerance and subrange specifications) of the first method. Conversely, the manufacturer may continue to use a previously used drill bit, which probably previously produced features with more uniform diameters than those shown in this example, so long as the manufacturer can manufacture a showerhead assembly with feature sizes as shown in this example.

Figure 3F:
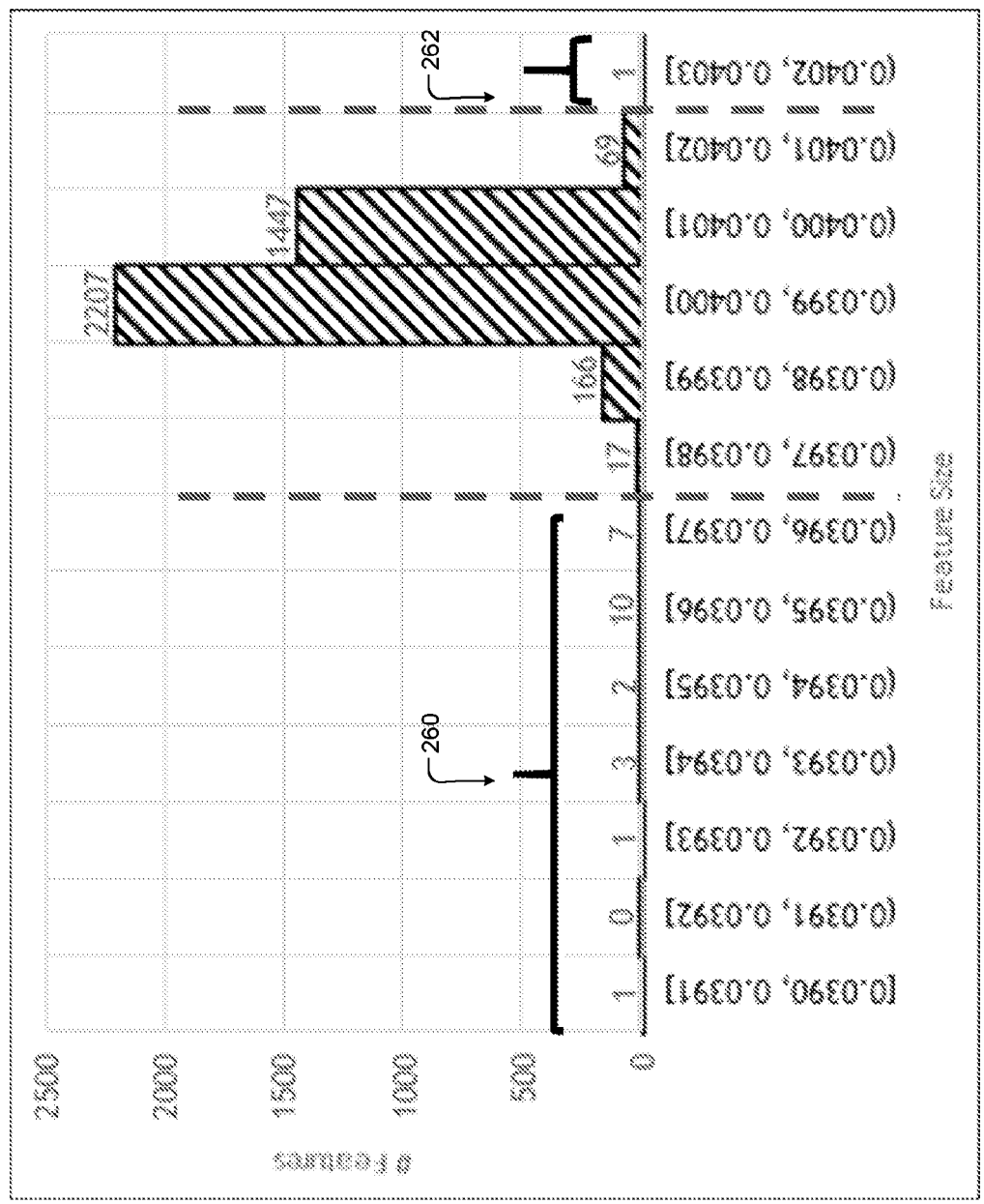
Figure 3G:
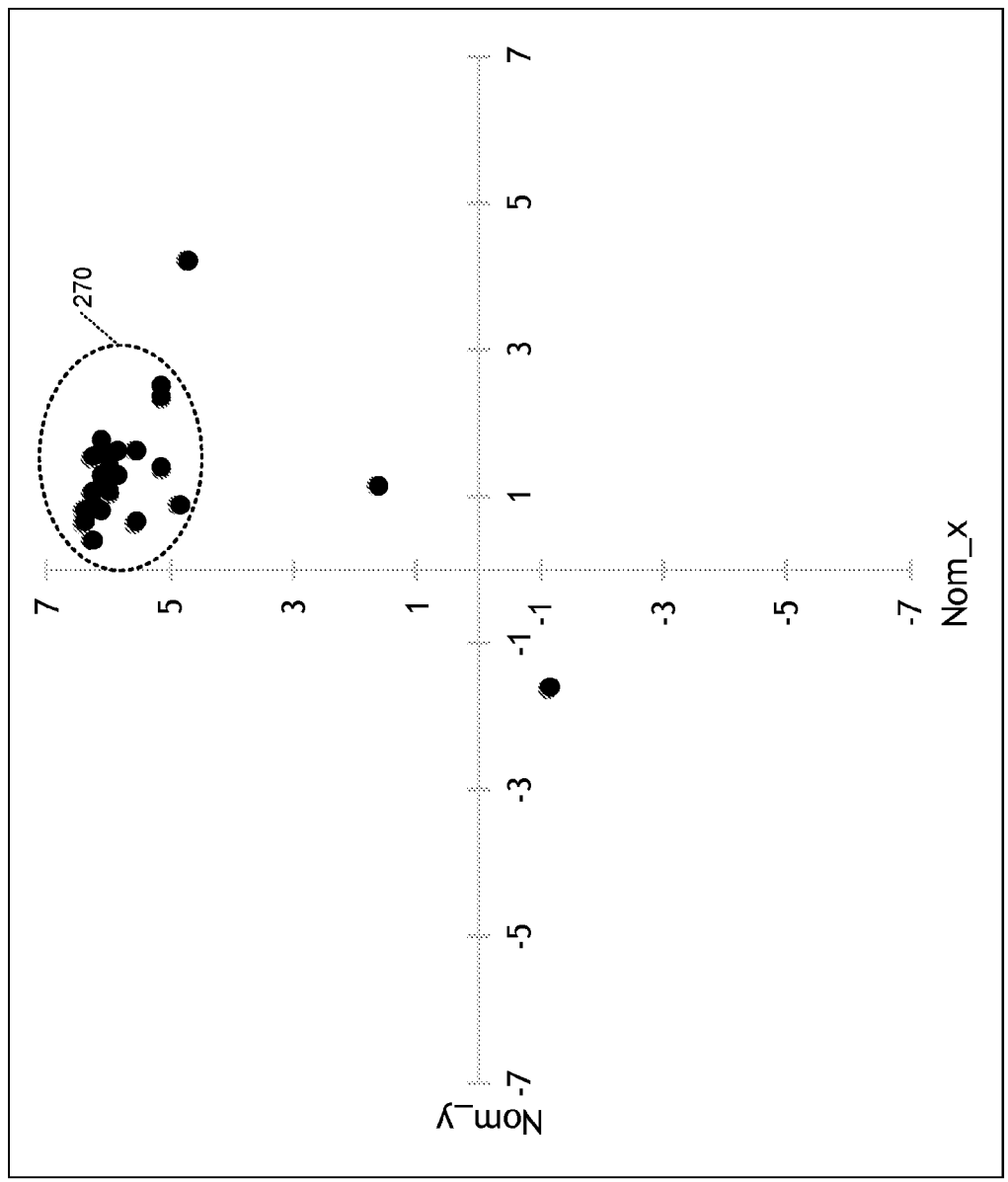

In FIGS. 3F and 3G, in a fifth example of a showerhead assembly manufactured according to the first method, the diameters of all of the 3931 features are within the first tolerance range, which is 0.04 inch ±0.001 inch in this example, where 0.04 inch is the specified nominal diameter. However, the diameters of 26 of the 3931 features identified at 260 and 262 are not specified subrange, which is within 0.0005 inch of the specified nominal diameter in this example (shown by two vertical dotted lines), and are therefore called outliers 260, 262. That is, the difference between the specified nominal diameter and the diameter of each of the outliers 260, 262 is greater than the specified subrange, which is 0.0005 inch in this example. Accordingly, although the diameters of the outliers 260, 262 are within the first tolerance range, the diameters of the outliers 260, 262 are not within the specified subrange.

Further, as shown at 270 in FIG. 3G, at least some of the outliers 250, 252 are not spaced apart from each other by at least one inch, which is the minimum distance required between features that are not within the specified subrange in this example. Therefore, although manufactured according to the first tolerance range, the showerhead assembly in this example is unacceptable since it fails the subrange minimum distance rule specifications of the first method.

Figure 3H:
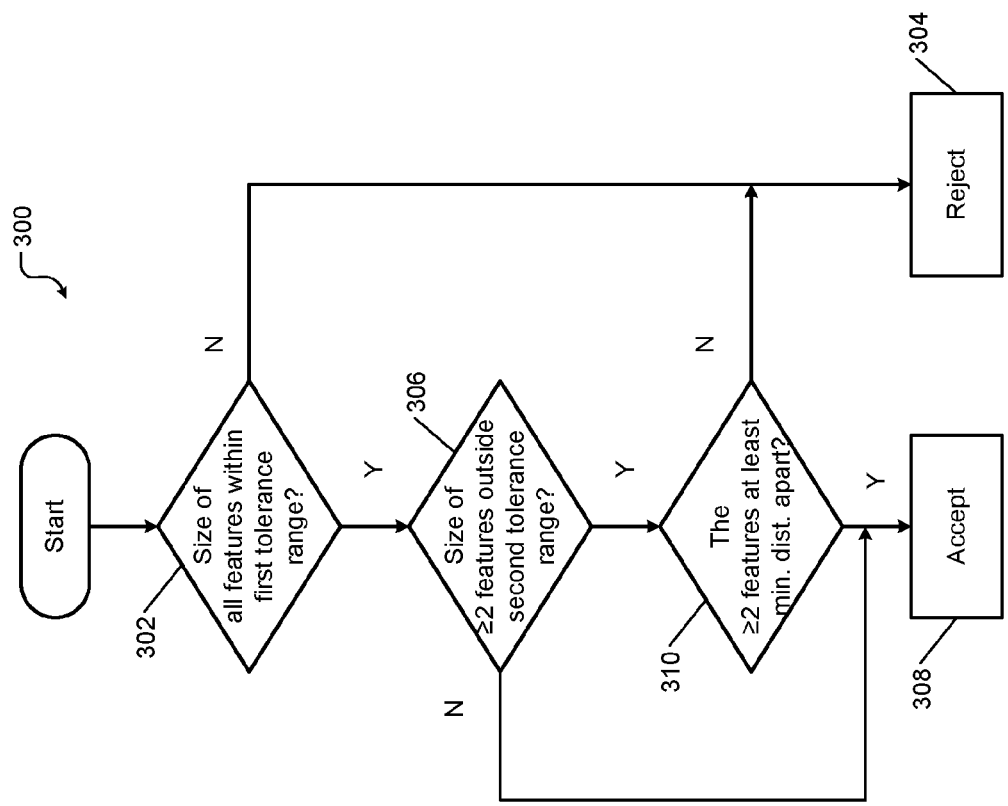
FIG. 3H shows a flowchart of the first method according to the present disclosure.

FIG. 3H shows the first method (identified at 300) of manufacturing and/or qualifying a showerhead using the subrange and the minimum distance rule. At 302, the first method 300 determines whether the size of all of the features is within the first tolerance range (i.e., the larger tolerance range; e.g., 0.04 inch±0.001 inch, where 0.04 inch is the specified nominal diameter). If the size of all of the features is not within the first tolerance range, the first method 300 ends at 304 and the component is rejected at 304. If the size of all of the features is within the first tolerance range, the first method 300 determines at 306 whether the size of two or more of the features is outside the second tolerance range (i.e., the subrange; e.g., 0.0005 inch of the specified nominal diameter). If the size of two or more of the features is not outside the second tolerance range, the first method 300 ends at 308 and the component is accepted at 308. If the size of two or more of the features is outside the second tolerance range, the first method 300 determines at 310 whether the two or more of the features are spaced apart by a predetermined minimum distance (e.g., at least 1 inch). If the two or more of the features are spaced apart by the predetermined minimum distance, the first method 300 ends at 308 and the component is accepted at 308. If the two or more of the features are not spaced apart by the predetermined minimum distance, the first method 300 ends at 304 and the component is rejected at 304.

The first method can be used by the manufacturer to produce components compliant with the subrange and minimum distance specifications as well as to qualify manufactured components. For example, the manufacturer can monitor the wear on the drill bits and/or the variation in feature dimensions (e.g., feature diameter/geometry) during manufacturing. For example, the manufacturer can use a meteorology tool, a coordinate measuring machine (CMM), and optical probe, or other techniques to inspect the features after they are drilled and to measure the feature sizes. Once these features are measured, the measured data can be analyzed to determine if the features meet the criteria of the subrange and minimum distance specifications. Based on the data analyses, the manufacturer can also determine how many components can be produced with the same drill bit (i.e., without changing the drill bit) so as to produce components with features compliant with the subrange and minimum distance specifications. For example, the manufacturer can determine that the same drill bit can be used to produce up to four showerheads (i.e., a total of about 16,000 features). The manufacturer may determine and use a unique drilling pattern to drill all of the nearly 4000 features on a showerhead. For example, the drilling sequence may be divided into multiple zones on a showerhead. The manufacturer is free to select a drilling pattern/sequence/drill bit wear lifetime. Regardless of the selection, the features produced are measured to confirm that the feature sizes meet the specifications.

The second method specifying the three statistical conditions mentioned above is now described with reference to FIGS. 4A-4I. Feature size (e.g., diameter) of a component (e.g., a showerhead) is typically defined by a symmetric plus/minus tolerance range, similar to most mechanical feature dimensions. However, due to the high number of features (e.g., through holes or outlets) typical to some components such as showerheads, the probability that a single feature can fall outside of a normal distribution is relatively high. When taking into account machining capabilities, tool variance, material deviation, and other factors, feature tolerance ranges are far wider than they could be if the feature count was relatively small, in order to prevent high rejection rate of components during manufacturing inspection. Given the more stringent process control requirements, traditional tolerance schemes for features have become outdated. The second method of manufacturing components with statistically significant feature population is designed to account for tighter tolerance constraints while accounting for manufacturing variations.

Manufacture of a large population of features using a single tool attachment (e.g., a cutter) can induce a linear variance in one or more dimensions of a population of features. For example, as the attachment wears, the resultant average feature size (e.g., diameter) tends to drift over time, resulting in features manufactured at the end of a sequence deviating from starting features. If drilling several thousand features, the drill bit will wear over time, creating a predictably smaller size in the ending features than the starting features. When manufacturing a large array of features, the best practice is to develop a randomized sequence for machining features to distribute wear throughout the set of features. This results in physical averaging of the features. According to the second method, a component passes inspection for feature size if the following three statistical requirements or specifications of the second method are satisfied: first, no feature diameter exceeds the cutoff tolerance range t; second, the population mean does not exceed the max mean deviation $D_T$; and third, the standard deviation of the population does not exceed $SD_{max}$.

Figure 4C:
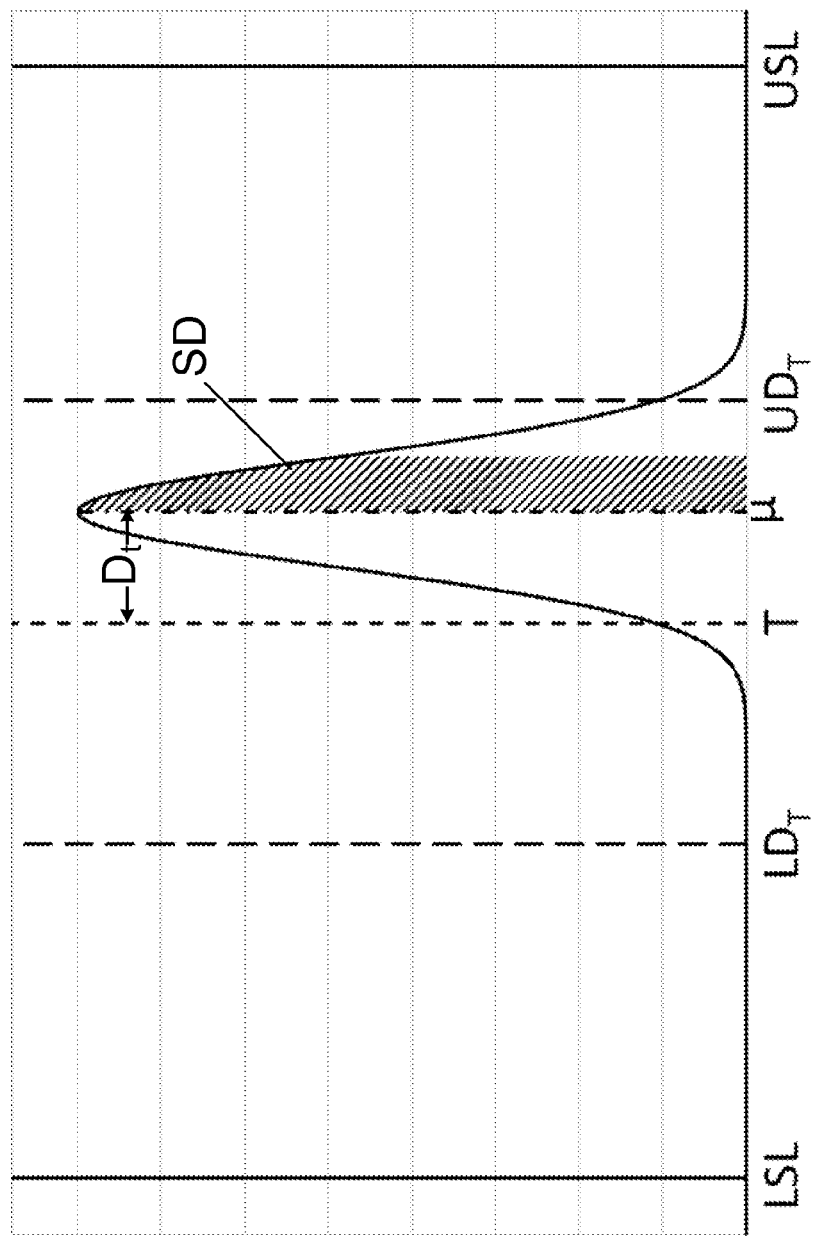
FIGS. 4C-4H show examples of histograms of feature sizes of showerheads manufactured using the second method according to the present disclosure.

FIGS. 4A and 4B show tables including symbols and descriptions of statistical parameters used in FIGS. 4C-4H to describe the second method. Throughout the description of the second method, a showerhead and diameter of its features are used as illustrative examples only. A diameter is a cross-sectional width of a circular feature as can be measured by an applicable measurement technique (e.g. CMM, optical, etc.).

In FIG. 4A, a first table shows statistical parameters used to describe and constrain feature-to-feature variance of the diameter. These statistical parameters represent bounding constraints for the feature population and not for each individual feature. The symbol T represents nominal target size (e.g., nominal diameter) of a feature and describes a target mean value of the diameter for all features as well as the target population mean. The symbol t represents a cutoff tolerance range that is specified as a±number. The cutoff tolerance range t is the distance from the nominal target size T that no feature can exceed, or the component is rejected. The symbol $D_T$ represents a maximum mean deviation from the nominal target size T for the mean of the entire feature population. The maximum mean deviation $D_T$ is the bounding window for the population mean and is specified as a±number. The maximum mean deviation $D_T$ does not define the range for any single feature but for the entire population defined within a feature pattern. The symbol $SD_{max}$ represents maximum standard deviation. The maximum standard deviation $SD_{max}$ is the maximum allowable standard deviation of the entire feature pattern that is calculated after inspection and measurements of all of the features.

In FIG. 4B, a second table shows statistical parameters that are calculated from the measured population data and that are used to quantify a feature population to determine if the feature population complies with the specifications (i.e., the three statistical requirements) of the second method. In the second table, the symbol USL is expressed as USL=T+t and represents an absolute maximum value that any feature diameter can have within the population. USL is calculated from the nominal target T plus the tolerance range t. The symbol LSL is expressed as LSL=T−t and represents an absolute minimum value that any feature diameter can have within the population. LSL is calculated from the nominal target T minus the tolerance range t. The symbol $UD_T$ is expressed as $UD_T$=T+$D_T$ and represents a maximum value that the feature population mean can have. The symbol $LD_T$ is expressed as $LD_T$=T−$D_T$ and represents a minimum value that the feature population mean can have. The symbol p represents a population mean and describes an actual population mean of the diameters for all features in the population. The symbol $D_\mu$ is expressed as $D_\mu$=μ−T and represents a bounding window for the population mean. $D_\mu$ (same as $D_T$) does not define a range for any single feature, but specifically for the entire population defined within the feature pattern.

Using these statistical parameters, the feature size can be specified in the following format. For example, the diameter of features such as through holes on a showerhead (e.g., the features 212-1 of the showerhead assembly 200 shown in FIGS. 2A-2C) can be specified as follows: 3894X 0.040±0.001 $D_T$:±0.0005 SD:6E-5; where 3894 is the number or quantity of features, 0.040 inch is the nominal feature target size T, ±0.001 inch is the cut off tolerance t, $D_T$:±0.0005 inch is the maximum mean deviation, and SD is the maximum allowable standard deviation $SD_{max}$.

FIGS. 4C-4H show histograms of feature sizes of showerheads manufactured using the second method. In each of the FIGS. 4C-4H, an overlay of a distribution curve that fits the data for a showerhead is used to visualize the statistical parameters. Then the criteria of the second method are applied to determine if the features meet the specifications as explained below.

Figure 4D:
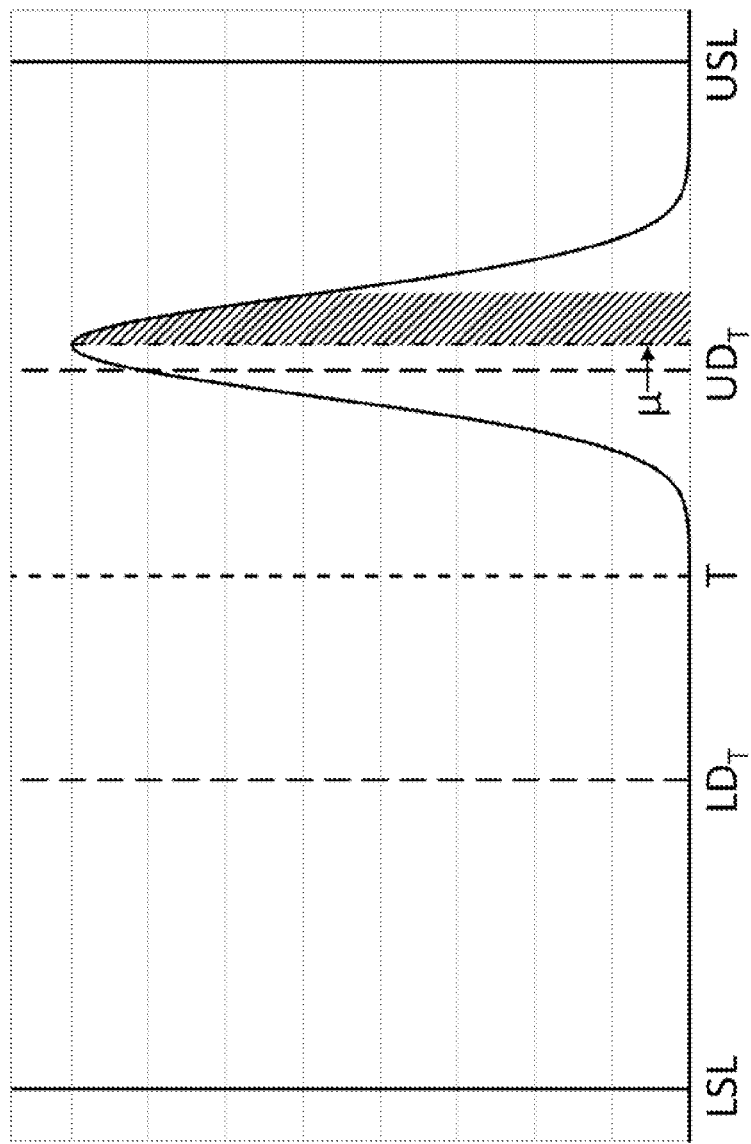
Figure 4E:
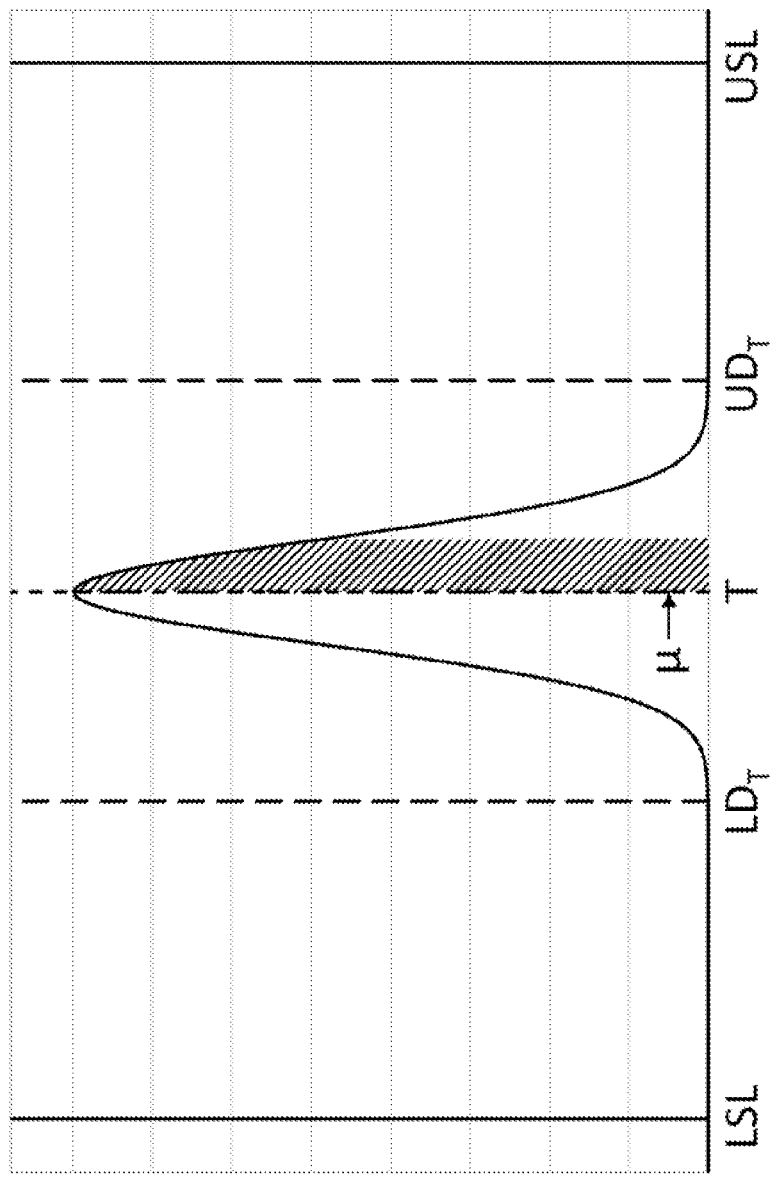
Figure 4F:
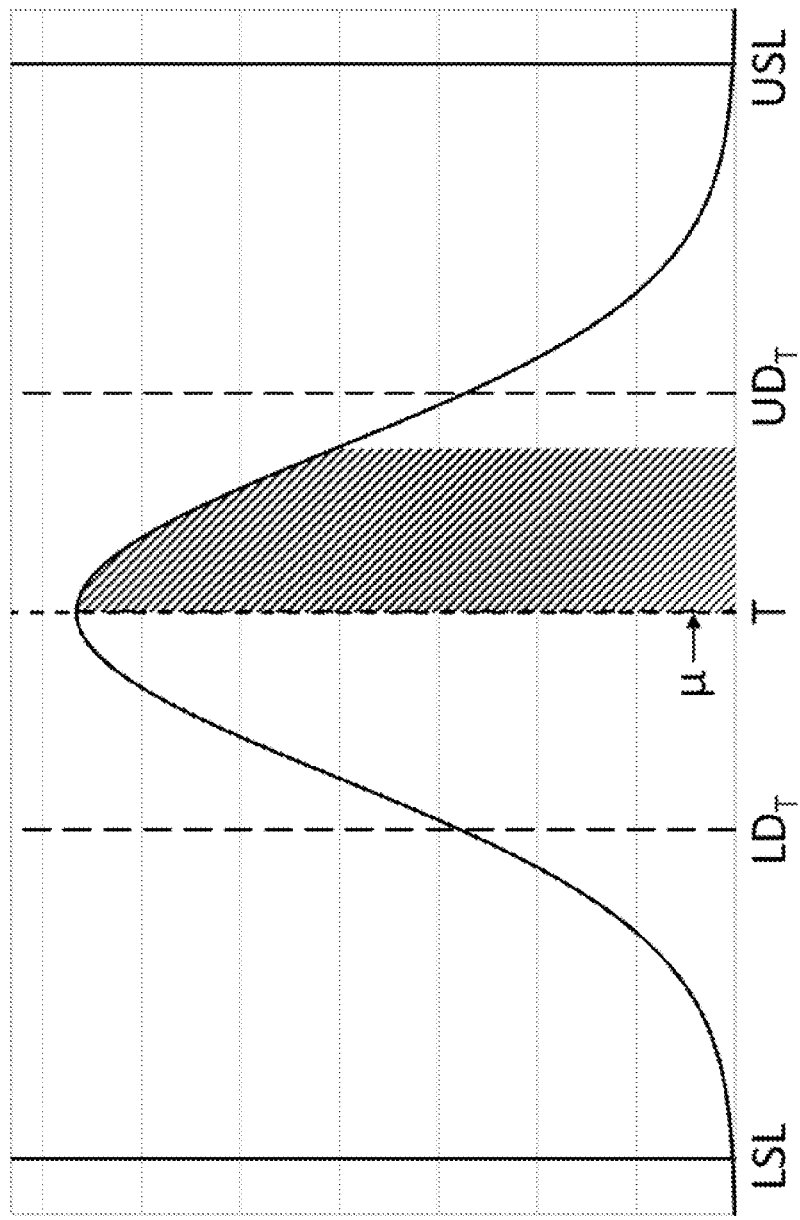
Figure 4G:
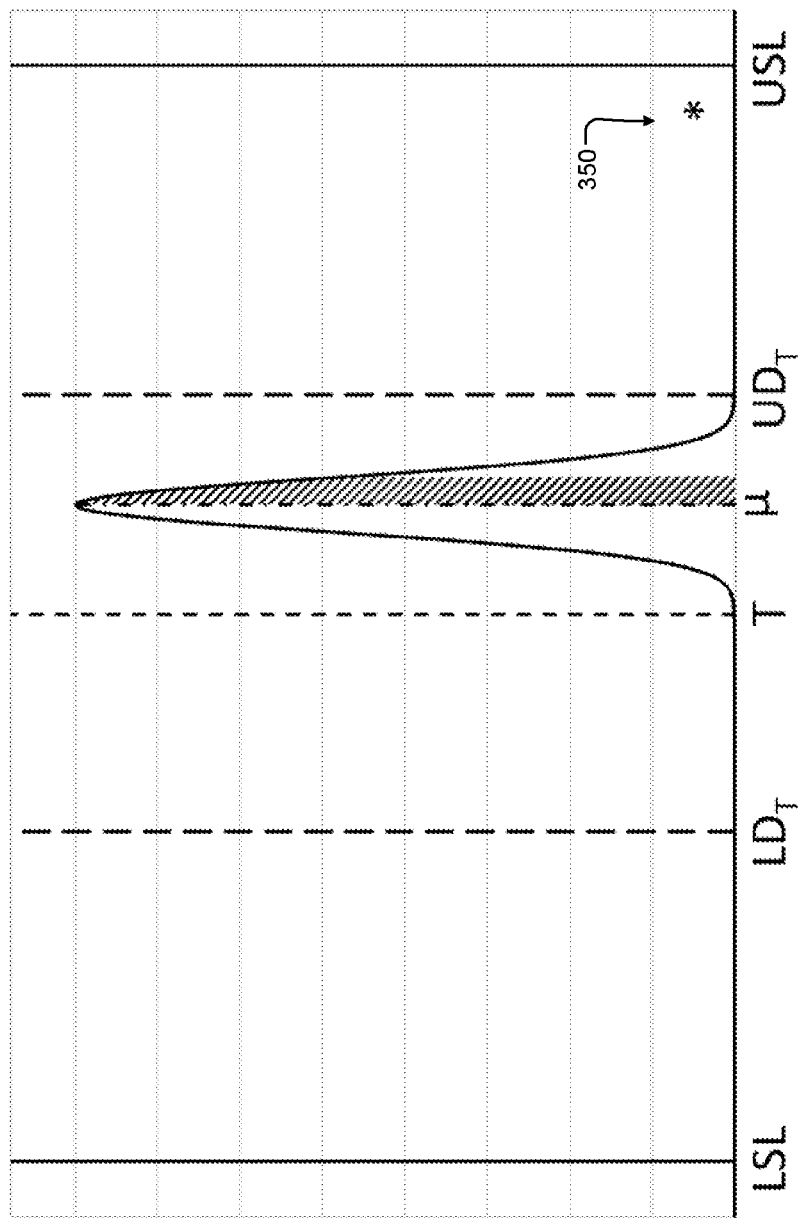
Figure 4H:
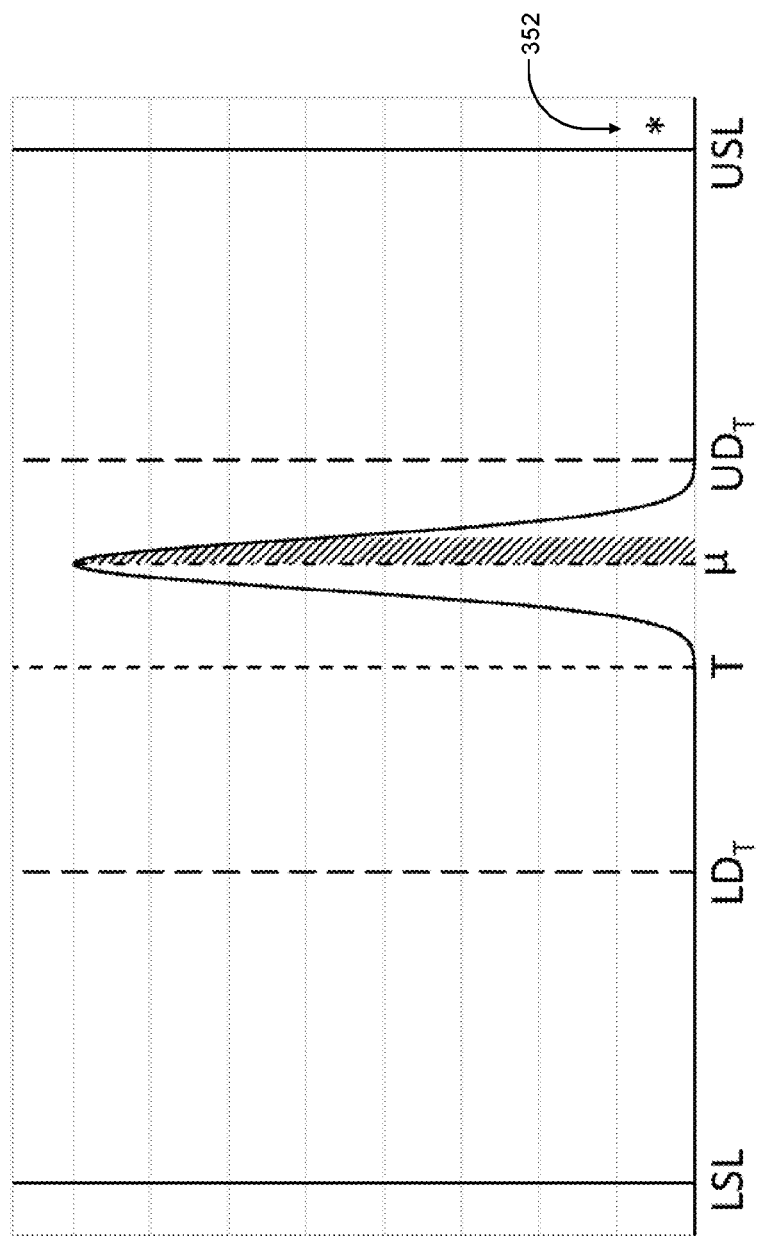

FIGS. 4C-4H show examples of acceptable and unacceptable feature populations based on each type of statistical parameter. For example, FIGS. 4C and 4D respectively show examples of acceptable and unacceptable feature populations based on population mean. FIGS. 4E and 4F respectively show examples of acceptable and unacceptable feature populations based on standard deviation. FIGS. 4G and 4H respectively show examples of acceptable and unacceptable feature populations based on outliers.

In FIGS. 4C-4H, population mean p is a distance $D_\mu$ from the feature target T. Shaded regions indicate 1σ standard deviation $SD_{max}$. Shaded regions widen as feature sizes spread out. USL and LSL boundaries are absolute maximum/minimum boundaries for all the features in the population.

In FIGS. 4C and 4D, for a feature population to pass the population mean criterion of the second method (i.e., the population mean does not exceed the max mean deviation $D_T$), the population mean μ needs to be within the $UD_t$ and $LD_t$ boundaries. In the example shown in FIG. 4C, the feature population passes the population mean criterion of the second method (i.e., the population mean does not exceed the max mean deviation $D_T$) since the population mean p is within the $UD_t$ and $LD_t$ boundaries. Additionally, the other two criteria of the second method, which include no feature size exceeds the cutoff tolerance range, and the standard deviation of the feature population does not exceed $SD_{max}$, are also satisfied. Accordingly, the showerhead in the example shown in FIG. 4C passes all three criteria of the second method and is therefore acceptable.

In the example shown in FIG. 4D, the feature population fails the population mean criterion of the second method (i.e., the population mean is too large and exceeds the max mean deviation $D_T$) since the population mean p is not within the $UD_t$ and $LD_t$ boundaries. Accordingly, the showerhead in the example shown in FIG. 4D is unacceptable since the showerhead fails the population mean criterion of the second method although the showerhead passes the other two criteria of the second method including no feature size exceeds the cutoff tolerance range, and the standard deviation of the feature population does not exceed $SD_{max}$.

In FIGS. 4E and 4F, the standard deviation $SD_{max}$, which is the maximum allowable population standard deviation, controls the spread of the features. In the example shown in FIG. 4E, the feature population passes the standard deviation criterion of the second method (i.e., the standard deviation of the population does not exceed $SD_{max}$). Additionally, the other two criteria of the second method, which include no feature size exceeds the cutoff tolerance range, and the population mean does not exceed the max mean deviation $D_T$, are also satisfied. Accordingly, the showerhead in the example shown in FIG. 4E passes all three criteria of the second method and is therefore acceptable.

In the example shown in FIG. 4F, the feature population fails the standard deviation criterion of the second method since the feature population has a standard deviation that is larger than the defined $SD_{max}$. Accordingly, the showerhead in the example shown in FIG. 4F is unacceptable since the showerhead fails the standard deviation criterion of the second method although the showerhead passes the other two criteria of the second method including no feature size exceeds the cutoff tolerance range, and the population mean does not exceed the max mean deviation $D_T$.

In FIGS. 4G and 4H, the cutoff tolerance range t defines the absolute maximum and minimum acceptable values for any feature within the feature population. In the example shown in FIG. 4G, an outlier 350 has a feature size that does not exceed the USL. As a result, the feature population passes the cutoff tolerance range criterion of the second method (i.e., no feature size exceeds the cutoff tolerance range t). Additionally, the other two criteria of the second method, which include the standard deviation of the feature population does not exceed $SD_{max}$, and the population mean does not exceed the max mean deviation $D_T$, are also satisfied. Accordingly, the showerhead in the example shown in FIG. 4G passes all three criteria of the second method and is therefore acceptable.

In the example shown in FIG. 4H, an outlier 352 has a feature size that exceeds the USL. As a result, the feature population fails the cutoff tolerance range criterion of the second method (i.e., a feature size exceeds the cutoff tolerance range t). Accordingly, the showerhead in the example shown in FIG. 4H is unacceptable since the showerhead fails the cutoff tolerance range criterion of the second method although the showerhead passes the other two criteria of the second method including the standard deviation of the feature population does not exceed $SD_{max}$, and the population mean does not exceed the max mean deviation $D_T$. Since a single outlier exceeds the USL, the showerhead in the example shown in FIG. 4H is unacceptable although both the mean and standard deviation are within the specification of the second method.

Note that the criterion max mean deviation $D_T$ of the second method is the same as the subrange specification of the first method. Further, the first method would also reject the showerhead in the example shown in FIG. 4H since the size of the outlier 352 is beyond the larger tolerance band of the first method. However, the first method would accept the showerhead if an outlier is outside the subrange but satisfies the minimum distance rule.

Figure 4I:
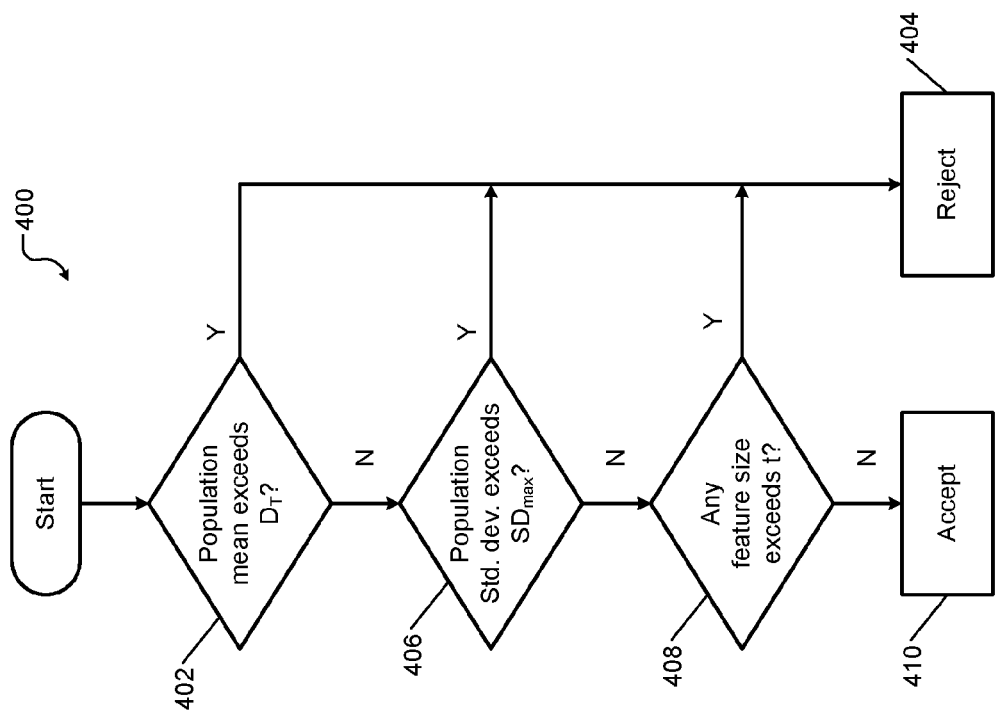
FIG. 4I shows a flowchart of the second method according to the present disclosure.

FIG. 4I shows the second method (identified at 400) of manufacturing and/or qualifying a showerhead using the statistical conditions. At 402, the second method 400 determines whether the feature population satisfies the first condition; that is, whether the mean for the population of features of a component such as a showerhead exceeds the maximum mean deviation $D_T$ of the population. If the population mean exceeds $D_T$, the component is rejected at 404.

If the population mean does not exceed $D_T$, at 406, the second method 400 determines whether the feature population satisfies the second condition; that is, whether the standard deviation for the population of features of the component exceeds the maximum standard deviation $SD_{max}$ of the population. If the population standard deviation exceeds $SD_{max}$, the component is rejected at 404.

If the population standard deviation also does not exceed $SD_{max}$, at 408, the second method 400 determines whether the feature population satisfies the third condition; that is, whether the size of any of the features of the component exceeds the cutoff tolerance range t. If the size of any of the features of the component exceeds the cutoff tolerance range t, the component is rejected at 404. If the size of any of the features of the component does not exceed the cutoff tolerance range t, all of the three conditions of the second method are satisfied, and the component is accepted at 410.

The second method can be used by the manufacturer to produce components compliant with the three statistical conditions as well as to qualify manufactured components. For example, the manufacturer can monitor the wear on the drill bits and/or the variation in feature dimensions (e.g., feature diameter/geometry) during manufacturing. For example, the manufacturer can use a meteorology tool, a coordinate measuring machine (CMM), and optical probe, or other techniques to inspect the features after they are drilled and to measure the feature sizes. Once these features are measured, the measured data can be analyzed to determine if the features meet the criteria of all three statistical conditions of the second method. Based on the data analyses, the manufacturer can also determine how many components can be produced with the same drill bit (i.e., without changing the drill bit) so as to produce components with features compliant with the criteria of the second method. For example, the manufacturer can determine that the same drill bit can be used to produce up to four showerheads (i.e., a total of about 16,000 features) while still meeting the criteria of the second method.

The manufacturer can randomize the manufacturing sequence of indicated large-population features to distribute any form of tool wear, thermal effects, or other step-dependent effect uniformly across the feature population.

This manufacturing sequence can be empirically ascertained and can then be repeated to produce components conforming to the specification of the second method. The manufacturer is free to select a drilling pattern/sequence/drill bit wear lifetime. Regardless of the selection, the features produced are measured to confirm that the feature sizes meet the specifications of the second method.

Figure 5:
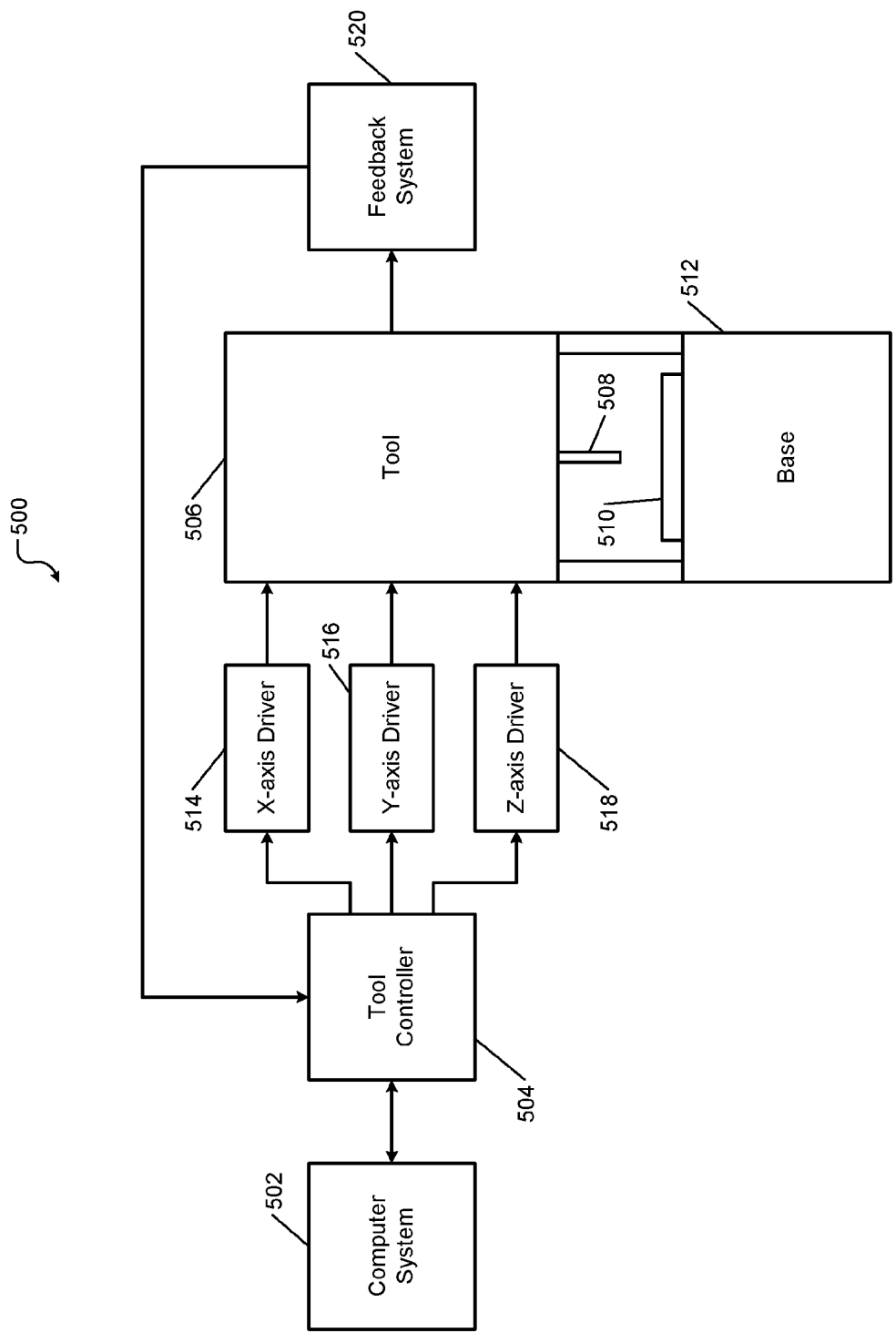
FIG. 5 shows a simplified block diagram of a system that can manufacture components using the first and second methods of the present disclosure.

FIG. 5 shows a simplified block diagram of a system that can manufacture features of components such as showerheads (e.g., showerhead 200 shown in FIGS. 2A-2C) using the first and second methods of the present disclosure. For example, a manufacturing system 500 comprises a computer system 502 and a tool controller 504 that controls a tool 506. The computer system 502 provides code to the tool controller 504 for manufacturing features in a component such as a showerhead according to the specifications of the methods of the present disclosure. The computer system 502 also provides a user interface on a display for an operator to operate, monitor, and control the tool 506.

The component is secured on a table 510 arranged on a base 512. The tool 506 comprises an attachment 508 (e.g., a drill bit or cutter) coupled to a motor to manufacture the features in the component. Based on the code, the tool controller 504 controls the rotational speed of the motor. The tool 506 further comprises actuators (not shown) that can move the motor in X, Y, and Z directions. The tool controller 504 controls the movement of the motor in the X, Y, and Z directions using an X-axis driver 514, a Y-axis driver 516, and a Z-axis driver 518. The drivers 514, 516, 518 drive the respective actuators to move the motor in the X, Y, and Z directions to correct locations in/on the component to manufacture the features according to the specifications.

In some tools, the component is held vertically (as opposed to horizontally as shown), and the attachment 514 operates on the component in a horizontal direction (as opposed to vertical direction shown) and produces the features in the component. In some applications, the table 510 can be moved relative to the attachment 514. The tool controller 504 controls the motion of the table 516 in X and Y axis direction.

A feedback system 520 provides feedback regarding position, speed, and so on of the motor and the actuators to the tool controller 504. The feedback system 520 comprises position and speed transducers that monitor/measure the position and speed of the motor and the actuators. The tool controller 504 receives signals from these transducers and generates control signals for correcting any position and speed errors based on these signals.

Further, while not shown, the tool 506 may include a lubrication/cooling system that dispenses a lubricant/coolant, such as proximate to the attachment 514 onto the work piece 514 during operation. The tool controller 504 can also implement auxiliary control functions such as turning the lubricant/coolant on/off and changing the attachment 514.

After a predetermined number of components are manufactured according to the specifications, the tool 506 may automatically change the attachment 514 or may prompt the operator on the user interface of the computer system 502 to change the attachment 514. Accordingly, the tool 506 manufactures features on the components according to the specifications of each of the first and second methods of the present disclosure.

Figure 6:
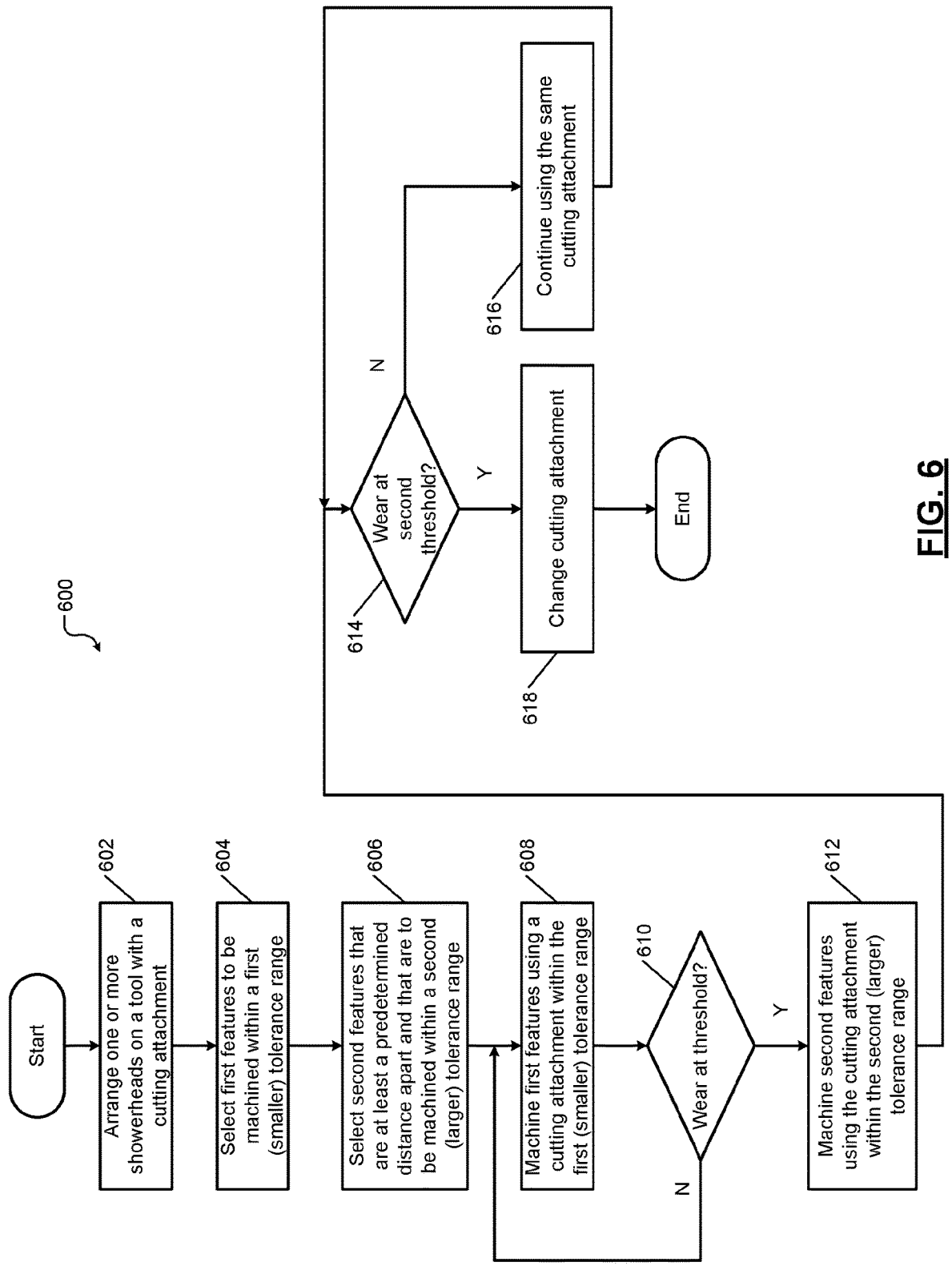
FIG. 6 shows a flowchart of a method to manufacture features of components according to the specifications of the first method of the present disclosure.

FIGS. 6 and 7 respectively show methods that a manufacturer can use to manufacture features of components such as showerheads according to the specifications of the first and second methods of the present disclosure. In FIGS. 6 and 7, wear on the attachment of the tool is used as an example of a parameter that can cause variations in feature dimensions. Other non-limiting examples of parameters that cause variations in feature dimensions include temperature of the cutting attachment, temperature of the tool, temperature of the component being machined, coolant flow, coolant temperature, operator error, foreign debris, and fixturing, setup, and general tolerances associated with the tool. These parameters can be measured and/or detected using suitable sensors installed in the tool or using external sensing/measuring devices. These parameters, alone or in any combination, can cause variations in feature dimensions. The methods of the present disclosure account for these parameters and produce features on components that satisfy the requirements of the specifications of the methods of the present disclosure.

FIG. 6 shows a method 600 that a manufacturer can use to manufacture features of components such as showerheads according to the specifications of the first method of the present disclosure. The method 600 can be performed using the system 500 shown in FIG. 5. Using the tool 506 and the attachment 508 (e.g., the cutting attachment described below), the method 600 can manufacture features in one component at a time or multiple components in tandem. Further, the method 600 can manufacture a first feature across one more showerheads. The method 600 can manufacture a second (i.e., different) feature using the same attachment across one or more components, where the second feature has a different specification than the first feature. For example, the second feature can have smaller specified dimensions than the first feature and can be manufactured using the attachment that is slightly worn after manufacturing the first feature. Alternatively, the second feature can include a modification to the first feature such as adding conical tips to cylindrical through holes.

In the method 600, at 602, one or more of the showerheads are arranged on a tool (e.g., tool 506 shown in FIG. 5) with a cutting attachment (e.g., attachment 508 shown in FIG. 5). At 604, the method 600 selects first selected features of a plurality of features to be machined within a first tolerance range of a specified dimension for the plurality of features. At 606, the method 600 selects second selected features of the plurality of features, that are located at least a predetermined distance apart, to be machined within a second tolerance range of the specified dimension for the plurality of features. The first tolerance range is smaller than the second tolerance range (i.e., the second tolerance range is the larger tolerance range, and the first tolerance range is the smaller subrange described above). Accordingly, features with the tighter tolerance are manufactured first when the cutting attachment has no or negligible wear.

For example, the first selected features and the second selected features are located on one of the showerheads. The first selected features and the second selected features are the same. If the first selected features and the second selected features are different, the second selected features will require a separate specification than the first selected features. The first selected features and the second selected features can be located on a plurality of the showerheads and can be manufactured in tandem. For example, all of the first selected features can be first manufactured on all of the showerheads, and then all of the second selected features can be manufactured on all of the showerheads.

At 608, the method 600 machines, using the cutting attachment, the first selected features of the plurality of features within the first tolerance range. At 610, the method 600 determines whether wear on the cutting attachment has reached a predetermined wear threshold. For example, the method 600 estimates the wear on the cutting attachment based on at least one of a machining time for which the cutting attachment is used on the tool, a number of features cut using the cutting attachment, and a sensed wear on the cutting attachment. The method 600 continues to machine the first selected features within the first tolerance range at 608 until the wear on the cutting attachment reaches the predetermined wear threshold. At 612, when the wear on the cutting attachment reaches the predetermined wear threshold, the method 600 machines, using the cutting attachment, the second selected features of the plurality of features within the second tolerance range.

At 614, the method 600 determines whether the wear on the cutting attachment has reached a second wear threshold at which the cutting attachment cannot manufacture the features according to the specifications of the first method. At 616, the method 600 continues to manufacture the features using the same cutting attachment until the wear on the cutting attachment reaches the second wear threshold. At 618, the method 600 stops using the cutting attachment once the wear on the cutting attachment has reached the second wear threshold, and the method 600 changes (i.e., replaces) the cutting attachment once the wear on the cutting attachment has reached the second wear threshold. Thus, the method 600 can change the cutting attachment after machining a predetermined number of features of the showerheads using the same cutting attachment. Stated differently, the method 600 can manufacture a predetermined number of features of the showerheads without changing the cutting attachment.

Further, as mentioned above, the method 600 can add a smaller feature with a corresponding specification while using the same but slightly worn attachment. For example, before machining the first and second selected features as described above, the method 600 can additionally selecting third selected features of a second plurality of features to be machined within a third tolerance range of a second specified dimension for the second plurality of features. The method 600 can select fourth selected features of the second plurality of features, that are located at least a second predetermined distance apart, to be machined within a fourth tolerance range of the second specified dimension, where the third tolerance range is smaller than the fourth tolerance range.

After or while machining the first and second selected features as described above, the method 600 can machine, using the same cutting attachment, the third selected features within the third tolerance range. When the wear on the cutting attachment reaches a second predetermined wear threshold, the method 600 can machine, using the same cutting attachment, the fourth selected features within the fourth tolerance range.

The third and fourth selected features are different than the first and second selected features. For example, the third and fourth selected features can include smaller features or can include modifications to the first and second selected features. The third and fourth selected features have separate specifications than the first and second selected features according to the first method. The second specified dimension for the third and fourth features is different than the specified dimension for the first and second selected features. The third and fourth tolerance ranges are different than the first and second tolerance ranges. The second predetermined distance is different than the predetermined distance. The first, second, third, and fourth selected features can be located on one of the showerheads. Alternatively, the first, second, third, and fourth selected features can be located on a plurality of the showerheads and can be manufactured in tandem as described above.

In some implementations, depending on the specifications, the method 600 can machine the third selected features after machining the first selected features and before machining the second selected features. Alternatively, the method 600 can machine the third and fourth selected features after machining the first selected features and before machining the second selected features. Alternatively, the method 600 can machine the third and fourth selected features after machining the second selected features.

In one example, a showerhead manufactured using the method 600 comprises a stem portion to connect to a processing chamber and a base portion extending from the stem portion and including a plurality of features to introduce a gas into the processing chamber (e.g., see FIG. 1 and corresponding description). First features of the plurality of features manufactured using the method 600 have dimensions within a first tolerance range of a specified dimension for the plurality of features. Second features of the plurality of features manufactured using the method 600 have dimensions within a second tolerance range of the specified dimension, where the first tolerance range is smaller than the second tolerance range. Further, the second features have dimensions not within (i.e., the dimensions are outside) the first tolerance range and are located at least a predetermined distance apart.

In some examples, the plurality of features includes through holes, and the dimensions include diameters of the through holes. In some examples, the plurality of features includes more than N hundred features, where N is an integer greater than 1. In some examples, the plurality of features includes more than N thousand features, where N is an integer greater than 1.

FIG. 7 shows a method 700 that a manufacturer can use to manufacture features of components such as showerheads according to the specifications of the second (statistical) method of the present disclosure. The method 700 can be performed using the system 500 shown in FIG. 5. Using the tool 506 and the attachment 508 (e.g., the cutting attachment described below), the method 700 can manufacture features in one component at a time or multiple components in tandem. Further, the method 700 can manufacture a first feature across one more showerheads.

The method 700 can manufacture a second (i.e., different) feature using the same attachment across one or more components, where the second feature has a different specification than the first feature. For example, the second feature can have smaller specified dimensions than the first feature and can be manufactured using the attachment that is slightly worn after manufacturing the first feature. Alternatively, the second feature can include a modification to the first feature such as adding conical tips to cylindrical through holes.

In the method 700, at 702, one or more of the showerheads are arranged on a tool (e.g., tool 506 shown in FIG. 5) with a cutting attachment (e.g., attachment 508 shown in FIG. 5). At 604, the method 600 selects first selected features of a plurality of features to be machined within a predetermined tolerance range of a specified dimension for the plurality of features. At 606, the method 600 selects second selected features of the plurality of features, which are interspersed with the first selected features, to be machined within the predetermined tolerance range of the specified dimension for the plurality of features.

For example, the first selected features and the second selected features are located on one of the showerheads. The first selected features and the second selected features are the same. If the first selected features and the second selected features are different, the second selected features will require a separate specification than the first selected features. The first selected features and the second selected features can be located on a plurality of the showerheads and can be manufactured in tandem. For example, all of the first selected features can be first manufactured on all of the showerheads, and then all of the second selected features can be manufactured on all of the showerheads.

At 708, the method 700 machines, using the cutting attachment, the first selected features of the plurality of features within the predetermined tolerance range. At 710, the method 700 determines whether wear on the cutting attachment has reached a predetermined wear threshold. For example, the method 700 estimates the wear on the cutting attachment based on at least one of a machining time for which the cutting attachment is used on the tool, a number of features cut using the cutting attachment, and a sensed wear on the cutting attachment. The method 700 continues to machine the first selected features within the predetermined tolerance range at 708 until the wear on the cutting attachment reaches the predetermined wear threshold. At 712, when the wear on the cutting attachment reaches the predetermined wear threshold, the method 700 machines, using the cutting attachment, the second selected features of the plurality of features within the predetermined tolerance range.

The method 700 machines the first and second selected features such that after machining, not only the first and second features are within the predetermined tolerance range but a mean value of dimensions of the first and second selected features is less than or equal to a predetermined mean deviation from the specified dimension and a standard deviation of the dimensions of the first and second selected features is less than or equal to a predetermined standard deviation. Thus, the dimensions of the first and second selected features satisfy all three criteria of the second method.

At 714, the method 700 determines whether the wear on the cutting attachment has reached a second wear threshold at which the cutting attachment cannot manufacture the features according to the specifications of the second method. At 716, the method 700 continues to manufacture the features using the same cutting attachment until the wear on the cutting attachment reaches the second wear threshold. At 718, the method 700 stops using the cutting attachment once the wear on the cutting attachment has reached the second wear threshold, and the method 700 changes (i.e., replaces) the cutting attachment once the wear on the cutting attachment has reached the second wear threshold. Thus, the method 700 can change the cutting attachment after machining a predetermined number of features of the showerheads using the same cutting attachment. Stated differently, the method 700 can manufacture a predetermined number of features of the showerheads without changing the cutting attachment.

In one example, a showerhead manufactured using the method 700 comprises a stem portion to connect to a processing chamber and a base portion extending from the stem portion and including a plurality of features to introduce a gas into the processing chamber (e.g., see FIG. 1 and corresponding description). First features of the plurality of features manufactured using the method 700 have dimensions within a predetermined tolerance range of a specified dimension for the plurality of features. Second features of the plurality of features manufactured using the method 700 have dimensions smaller than the first features, are interspersed with the first features, and have dimensions within the predetermined tolerance range. The first and second features are manufactured using the method 700 such that in addition to having the same predetermined tolerance range, a mean value of the dimensions of the first and second features is less than or equal to a predetermined mean deviation from the specified dimension, and a standard deviation of the dimensions of the first and second features is less than or equal to a predetermined standard deviation.

In some examples, the plurality of features includes through holes, and the dimensions include diameters of the through holes. In some examples, the plurality of features includes more than N hundred features, where N is an integer greater than 1. In some examples, the plurality of features includes more than N thousand features, where N is an integer greater than 1.

The foregoing description is merely illustrative in nature and is not intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims.

It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another are within the scope of this disclosure.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In some implementations, a controller is part of a system, which may be part of the above-described examples. Such systems can comprise semiconductor processing equipment, including a processing tool or tools, chamber or chambers, a platform or platforms for processing, and/or specific processing components (a pedestal, a gas flow system, etc.). These systems may be integrated with electronics for controlling their operation before, during, and after processing of a semiconductor wafer or substrate. The electronics may be referred to as the "controller," which may control various components or subparts of the system or systems.

The controller, depending on the processing requirements and/or the type of system, may be programmed to control any of the processes disclosed herein, including the delivery of processing gases, temperature settings (e.g., heating and/or cooling), pressure settings, vacuum settings, power settings, radio frequency (RF) generator settings, RF matching circuit settings, frequency settings, flow rate settings, fluid delivery settings, positional and operation settings, wafer transfers into and out of a tool and other transfer tools and/or load locks connected to or interfaced with a specific system.

Broadly speaking, the controller may be defined as electronics having various integrated circuits, logic, memory, and/or software that receive instructions, issue instructions, control operation, enable cleaning operations, enable endpoint measurements, and the like. The integrated circuits may include chips in the form of firmware that store program instructions, digital signal processors (DSPs), chips defined as application specific integrated circuits (ASICs), and/or one or more microprocessors, or microcontrollers that execute program instructions (e.g., software).

Program instructions may be instructions communicated to the controller in the form of various individual settings (or program files), defining operational parameters for carrying out a particular process on or for a semiconductor wafer or to a system. The operational parameters may, in some embodiments, be part of a recipe defined by process engineers to accomplish one or more processing steps during the fabrication of one or more layers, materials, metals, oxides, silicon, silicon dioxide, surfaces, circuits, and/or dies of a wafer.

The controller, in some implementations, may be a part of or coupled to a computer that is integrated with the system, coupled to the system, otherwise networked to the system, or a combination thereof. For example, the controller may be in the "cloud" or all or a part of a fab host computer system, which can allow for remote access of the wafer processing. The computer may enable remote access to the system to monitor current progress of fabrication operations, examine a history of past fabrication operations, examine trends or performance metrics from a plurality of fabrication operations, to change parameters of current processing, to set processing steps to follow a current processing, or to start a new process.

In some examples, a remote computer (e.g. a server) can provide process recipes to a system over a network, which may include a local network or the Internet. The remote computer may include a user interface that enables entry or programming of parameters and/or settings, which are then communicated to the system from the remote computer. In some examples, the controller receives instructions in the form of data, which specify parameters for each of the processing steps to be performed during one or more operations. It should be understood that the parameters may be specific to the type of process to be performed and the type of tool that the controller is configured to interface with or control.

Thus as described above, the controller may be distributed, such as by comprising one or more discrete controllers that are networked together and working towards a common purpose, such as the processes and controls described herein. An example of a distributed controller for such purposes would be one or more integrated circuits on a chamber in communication with one or more integrated circuits located remotely (such as at the platform level or as part of a remote computer) that combine to control a process on the chamber.

Without limitation, example systems may include a plasma etch chamber or module, a deposition chamber or module, a spin-rinse chamber or module, a metal plating chamber or module, a clean chamber or module, a bevel edge etch chamber or module, a physical vapor deposition (PVD) chamber or module, a chemical vapor deposition (CVD) chamber or module, an atomic layer deposition (ALD) chamber or module, an atomic layer etch (ALE) chamber or module, an ion implantation chamber or module, a track chamber or module, and any other semiconductor processing systems that may be associated or used in the fabrication and/or manufacturing of semiconductor wafers.

As noted above, depending on the process step or steps to be performed by the tool, the controller might communicate with one or more of other tool circuits or modules, other tool components, cluster tools, other tool interfaces, adjacent tools, neighboring tools, tools located throughout a factory, a main computer, another controller, or tools used in material transport that bring containers of wafers to and from tool locations and/or load ports in a semiconductor manufacturing factory.

What is claimed is:

1. A method of manufacturing showerheads for a substrate processing system, the method comprising:
    arranging one or more of the showerheads on a tool including a cutting attachment;
    selecting first selected features of a plurality of features to be machined within a first tolerance range of a specified dimension for the plurality of features;
    selecting second selected features of the plurality of features, that are located at least a predetermined distance apart, to be machined within a second tolerance range of the specified dimension for the plurality of features;
    machining, using the cutting attachment, the first selected features of the plurality of features within the first tolerance range; and
    when a parameter associated with the tool causing variation in dimension of the first selected features reaches a predetermined threshold, machining, using the cutting attachment, the second selected features of the plurality of features within the second tolerance range, wherein the first tolerance range is smaller than the second tolerance range.

2. The method of claim 1 wherein the parameter includes wear on the cutting attachment, temperature of the cutting attachment, temperature of the tool, or temperature of the one or more of the showerheads being machined.

3. The method of claim 1 wherein the parameter includes wear on the cutting attachment, the method further comprising estimating the wear on the cutting attachment based on at least one of a machining time for which the cutting attachment is used on the tool, a number of features cut using the cutting attachment, and a sensed wear on the cutting attachment.

4. The method of claim 1 wherein the first selected features and the second selected features are located on one of the showerheads or on a plurality of the showerheads.

5. The method of claim 1 wherein the parameter includes wear on the cutting attachment, the method further comprising changing the cutting attachment of the tool when the cutting attachment reaches a second predetermined threshold greater than the predetermined threshold.

6. The method of claim 1 further comprising changing the cutting attachment of the tool after machining a predetermined number of the showerheads using the cutting attachment.

7. The method of claim 1 further comprising:
selecting third selected features of a second plurality of features to be machined within a third tolerance range of a second specified dimension for the second plurality of features;
selecting fourth selected features of the second plurality of features, that are located at least a second predetermined distance apart, to be machined within a fourth tolerance range of the second specified dimension;
machining, using the cutting attachment, the third selected features within the third tolerance range; and
when the parameter reaches a second predetermined threshold, machining, using the cutting attachment, the fourth selected features within the fourth tolerance range,
wherein the third tolerance range is smaller than the fourth tolerance range.

8. The method of claim 7 wherein:
the third and fourth selected features are different than the first and second selected features;
the second specified dimension is different than the specified dimension;
the third and fourth tolerance ranges are different than the first and second tolerance ranges; and
the second predetermined distance is different than the predetermined distance.

9. The method of claim 7 wherein the first, second, third, and fourth selected features are located on one of the showerheads.

10. The method of claim 7 wherein the first, second, third, and fourth selected features are located on a plurality of the showerheads.

11. The method of claim 7 further comprising machining the third selected features after machining the first selected features and before machining the second selected features.

12. The method of claim 7 wherein the third and fourth selected features modify the first and second selected features.

13. The method of claim 7 further comprising machining the third and fourth selected features after machining the first selected features and before machining the second selected features.

14. The method of claim 7 further comprising machining the third and fourth selected features after machining the second selected features.

* * * * *